(12) United States Patent
Kim

(10) Patent No.: US 8,111,366 B2
(45) Date of Patent: *Feb. 7, 2012

(54) LIQUID CRYSTAL DISPLAY AND METHOD OF DRIVING THE SAME

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,382

(22) Filed: Nov. 10, 2010

(65) Prior Publication Data

US 2011/0057867 A1 Mar. 10, 2011

Related U.S. Application Data

(63) Continuation of application No. 11/856,234, filed on Sep. 17, 2007, now Pat. No. 7,852,446.

(30) Foreign Application Priority Data

Sep. 18, 2006 (KR) .................. 10-2006-0090039
Nov. 14, 2006 (KR) .................. 10-2006-0112008

(51) Int. Cl.
*G02F 1/1343* (2006.01)

(52) U.S. Cl. ..................................... 349/143

(58) Field of Classification Search .................. None
See application file for complete search history.

(56) References Cited

U.S. PATENT DOCUMENTS

| | | | | |
|---|---|---|---|---|
| 6,639,633 | B2 * | 10/2003 | Song et al. | 349/40 |
| 2004/0070713 | A1 * | 4/2004 | Song | 349/129 |
| 2006/0044241 | A1 | 3/2006 | Yuh-Ren et al. | |
| 2007/0091243 | A1 * | 4/2007 | Hong et al. | 349/150 |

FOREIGN PATENT DOCUMENTS

| | | |
|---|---|---|
| JP | 10115834 A | 5/1998 |
| JP | 11109313 A | 4/1999 |
| JP | 11153980 A | 6/1999 |
| JP | 11175037 A | 7/1999 |
| JP | 11237607 A | 8/1999 |
| JP | 2001343946 A | 12/2001 |
| KR | 19950019871 | 7/1995 |
| KR | 19990044809 | 6/1999 |
| KR | 1020010029355 A | 4/2001 |
| KR | 1020010047885 A | 6/2001 |
| KR | 1020010109147 A | 12/2001 |

* cited by examiner

*Primary Examiner* — Sung Pak

(74) *Attorney, Agent, or Firm* — Cantor Colburn LLP

(57) ABSTRACT

A liquid crystal display includes; a first substrate, a plurality of pixels arranged substantially in a matrix-shape on the first substrate; a plurality of gate lines disposed on the first substrate and which transmit gate signals to the pixels, and a plurality of data lines which intersect the gate lines and which transmit data voltages to the pixels, wherein at least two adjacent gate lines are electrically connected to each other.

23 Claims, 23 Drawing Sheets

10

LIQUID CRYSTAL DISPLAY AND METHOD OF DRIVING THE SAME

CROSS REFERENCE TO RELATED APPLICATIONS

This application is a continuation application of U.S. application Ser. No. 11/856,234 filed Sep. 17, 2007, which claims priority to Korean Patent Application Nos. 10-2006-0090039 and 10-2006-0112008, respectively filed on Sep. 18, 2006 and Nov. 14, 2006, the contents of which in their entirety are herein incorporated by reference.

BACKGROUND OF THE INVENTION (a) Field of the Invention

The present invention relates to a liquid crystal display and a method of driving the same.

(b) Description of the Related Art

A liquid crystal display ("LCD") is one of the most widely used type of flat panel display. The LCD includes two display panels on which field generating electrodes such as pixel electrodes and a common electrode are forsmed, and a liquid crystal layer inserted therebetween. The field generating electrodes generate an electric field in the liquid crystal layer when a voltage is applied thereto, thus determining alignment of liquid crystal molecules of the liquid crystal layer and controlling polarization of incident light. By controlling the polarization of incident light an LCD may also control the transmittance of that light to an outside. A plurality of pixels, each individually controlling the transmittance of light therethrough may thereby display an image.

The liquid crystal display also includes a switching element connected to each pixel electrode, and a plurality of signal lines such as gate lines and data lines for applying a voltage to the pixel electrodes by controlling the switching elements.

Because an LCD is widely used as a display screen of a television as well as a display device of a computer, displaying moving images has become increasingly important. An LCD may rapidly display a series of slightly changing images; each image in the series is called a frame, which is perceived as motion when viewed by the human eye. However, a response speed of liquid crystal in the LCD is slow, and it is difficult to display moving images. Accordingly, development of a LCD having a faster driving speed is needed.

In addition, as a size of the LCD increases, the number of pixels, gate lines and data lines also increases. Because a time for charging a pixel is inversely proportional to the number of gate lines, as the number of the gate line increases, a charge time of any individual pixel is shortened. This presents an additional problem, in that an LCD which has a high driving speed may not secure a sufficient charge time for each pixel.

Another concern is that, parasitic capacitance is generated between a data line and a pixel electrode in the LCD. The parasitic capacitance influences a voltage applied to the pixel electrode, this is particularly apparent when a low gray voltage is applied, and luminance changes by changing an electrode voltage of a subpixel which applies a higher voltage than the surrounding subpixels. Thereby, vertical crosstalk is generated, and the vertical crosstalk deteriorates image quality of the LCD.

BRIEF SUMMARY OF THE INVENTION

The present invention provides a liquid crystal display ("LCD") having advantages of securing a sufficient charge time even when a size of the LCD increases and the LCD drives with a high speed.

Furthermore, the present invention has been made in an effort to provide an LCD having advantages of preventing vertical crosstalk from being generated.

In addition, the present invention provides an "LCD" having advantages of efficiently arranging signal lines of an LCD.

An exemplary embodiment of the present invention provides an LCD including; a first substrate, a plurality of pixels arranged substantially in a matrix-shape, on the first substrate, a plurality of gate lines disposed on the first substrate and which transmit gate signals to the pixels, and a plurality of data lines which intersect the gate lines and which transmit data voltages to the pixels, wherein at least two adjacent gate lines are electrically connected to each other.

In one exemplary embodiment the pixels may include a plurality of pixel electrodes which are disposed on the first substrate, and a plurality of switching elements, each being connected to at least one pixel electrode of the plurality of pixel electrodes, at least one gate line of the plurality of gate lines, and at least one data line of the plurality of data lines.

In one exemplary embodiment each gate line forms a pair with an adjacent gate line and the paired gate lines may be electrically connected to each other.

In one exemplary embodiment the data lines may include a plurality of pairs of data lines wherein each pair of data lines includes a first data line and a second data line and wherein a pair of data lines are disposed between adjacent columns of pixels.

In one exemplary embodiment the switching elements of adjacent pixels in a column direction may be connected to different data lines of the first and second data lines.

In one exemplary embodiment the switching elements of adjacent pixels in a row direction may be connected to different data lines of the first and second data lines.

In one exemplary embodiment four adjacent gate lines of the plurality of gate lines may be electrically connected to each other.

In one exemplary embodiment the data lines may include a plurality of groups of data lines wherein each group of data lines includes a first, second, third and fourth data line and the group of data lines is disposed between adjacent columns of pixels.

In one exemplary embodiment within each group the third data line is disposed to the left of the fourth data line, the fourth data line is disposed to the left of the first data line and the first data line is disposed to the left of the second data line.

In one exemplary embodiment the switching elements of adjacent pixels in a column direction may be connected to different data lines.

In one exemplary embodiment the switching elements of an i-th row of pixels and the switching elements of an (i+1)-th row of pixels may be connected to the second data line and the third data line, respectively.

In one exemplary embodiment the switching elements of an (i+2)-th row of pixels and the switching elements of an (i+3)-th row of pixels may be connected to the first data line and the fourth data line, respectively.

In one exemplary embodiment the switching elements of adjacent pixels in a row direction may be connected to differently numbered data lines.

In one exemplary embodiment each pixel comprises a first side, a second side attached to the first side, a third side disposed substantially opposite the first side, and a fourth side disposed substantially opposite the second side, and each pixel of the plurality of pixels has substantially the same orientation, and wherein the switching elements of a first pixel in a row direction may be connected to a data line disposed on a first side of the first pixel and the switching element of a second pixel adjacent to the first pixel in a row direction is connected to a data line disposed on a third side of the second pixel.

In one exemplary embodiment the polarity of data voltages which are applied to the first and second data lines may be substantially identical, and the polarity of data voltages which are applied to the third and fourth data lines may be substantially identical.

In one exemplary embodiment the polarity of data voltages which are applied to the first and second data lines and the polarity of data voltages which are applied to the third and fourth data lines may be substantially opposite to each other.

In one exemplary embodiment at least one of the first and second data lines may overlap with the pixel electrodes, and at least one of the third and fourth data lines may overlap with the pixel electrodes.

In one exemplary embodiment each of the switching elements may include a gate electrode, a source electrode, and a drain electrode, and the source electrode may be electrically connected to at least one of the first to first to fourth data lines through a connecting member.

In one exemplary embodiment the surface area of the connecting members is substantially the same for connecting each of the first to fourth data lines to the source electrode.

In one exemplary embodiment an LCD may further include a passivation layer which is disposed between the data lines and the pixel electrodes, wherein the passivation layer includes a plurality of first contact holes which expose each of the first to fourth data lines and a second contact hole which exposes the source electrode, and the connection member may connect each of the first to fourth data lines with the source electrode through the first and second contact holes.

In one exemplary embodiment the passivation layer may include an organic insulating material.

In one exemplary embodiment the pixel electrode may include first and second subpixel electrodes which are separated from each other, at least one of the first and second data lines may overlap the second subpixel electrode and at least one of the third and fourth data lines may overlap the second subpixel electrode.

In one exemplary embodiment the pixel electrode may further include first and second subpixel electrodes which are separated from each other.

In one exemplary embodiment an area of the first subpixel electrode may be smaller than an area of the second subpixel electrode.

In one exemplary embodiment the switching element may include a first switching element connected to the first subpixel electrode and a second switching element connected to the second subpixel electrode.

In one exemplary embodiment the first and second switching elements may be connected to the same gate line and data line.

In one exemplary embodiment an LCD may further include a first storage electrode line which receives a first signal, a second storage electrode line which receives a second signal which is different from that received by the first storage electrode line, and a third storage electrode line which receives a substantially constant voltage, and the first subpixel electrode may overlap the first or second storage electrode line and the second subpixel electrode may overlap the third storage electrode line.

In one exemplary embodiment signals applied to the first storage electrode line and the second storage electrode line may have substantially opposite phases.

In one exemplary embodiment a voltage applied to the first subpixel electrode may be different from a voltage applied to the second subpixel electrode.

In one exemplary embodiment a voltage applied to the first subpixel electrode may be higher than a voltage applied to the second subpixel electrode.

In one exemplary embodiment at least one of the first and second subpixel electrodes may have a first inclination direction determination member.

In one exemplary embodiment the first inclination direction determination member may include a cutout.

In one exemplary embodiment the data line may overlap the second subpixel electrode.

In one exemplary embodiment an LCD may further include a common electrode disposed substantially opposite the first and second subpixel electrodes, and wherein the common electrode may include a second inclination direction determination member.

In one exemplary embodiment the second inclination direction determination member may include at least one of a cutout and a protrusion.

In one exemplary embodiment a liquid crystal molecule of the liquid crystal layer may have a longitudinal axis disposed substantially perpendicular to the first substrate, in a state where an electric field is absent.

In one exemplary embodiment the pixel electrode may include two pairs of edges wherein the edges in each pair are substantially parallel to one another.

In one exemplary embodiment the data line may overlap the pixel electrode.

In one exemplary embodiment a liquid crystal display may further include a storage electrode which overlaps the pixel electrode.

In one exemplary embodiment voltages of neighboring pixel electrodes in at least one of a column direction and a row direction may have substantially opposite polarities.

In one exemplary embodiment a liquid crystal display may further include a second substrate disposed opposite to the first substrate, a common electrode disposed on the second substrate, and a liquid crystal layer which is interposed between the pixel electrode and the common electrode, wherein liquid crystal molecules constituting the liquid crystal layer may be aligned in a splay alignment in a state where an electric field is absent, and may be aligned in a bend alignment in the presence of an electric field.

In one exemplary embodiment a liquid crystal display may further include a common electrode disposed on the first substrate and opposite to the pixel electrode.

In one exemplary embodiment the pixel electrode may include a plurality of cutouts which form an oblique angle with at least one of the plurality of gate lines.

In one exemplary embodiment the pixel electrode may include an inorganic insulating layer disposed between the pixel electrode and the common electrode.

In one exemplary embodiment data voltages applied to adjacent data lines may have substantially opposite polarities.

In one exemplary embodiment a liquid crystal display may further include a data driver connected to the data line which transmits a data voltage to at least one of the plurality of data lines, wherein the data driver may include first and second data drivers disposed substantially opposite to each other with respect to an individual pixel, and first and second data lines may be connected to different data drivers of the first and second data drivers.

In another exemplary embodiment of the present invention a liquid crystal display includes a plurality of pixels, including; a plurality of gate lines which transmit gate signals to the pixels, a plurality of data lines which transmit a data voltage to the pixels and which intersect the gate lines, wherein each pixel includes; first and second liquid crystal capacitors, a first storage capacitor having a first terminal connected to the first liquid crystal capacitor and a second terminal which receives one of a first storage electrode signal and a second storage electrode signal having a phase which is opposite to the phase of the first storage electrode signal, and a second storage capacitor having a first terminal which is connected to the second liquid crystal capacitor and a second terminal which receives a constant voltage, wherein at least two adjacent gate lines are electrically connected to each other.

In one exemplary embodiment each pixel may further include; a first switching element connected to at least one of the plurality of gate lines, at least one of the plurality of data lines, the first liquid crystal capacitor, and the first storage capacitor, and a second switching element which is connected to the at least one of the plurality of gate lines, the at least one of the plurality of data lines, the second liquid crystal capacitor, and the second storage capacitor.

In one exemplary embodiment the first and second liquid crystal capacitors may include first and second subpixel electrodes and a common electrode.

In one exemplary embodiment an area of the second subpixel electrode may be larger than an area of the first subpixel electrode.

In one exemplary embodiment each of the plurality of gate lines forms a pair with an adjacent gate line and the paired gate lines may be electrically connected to each other.

In one exemplary embodiment the plurality of data lines may include a plurality of pairs of a first data wherein each pair of data lines includes a first data line and a second data line and wherein a pair of data lines are disposed between adjacent columns of pixels.

In one exemplary embodiment four adjacent gate lines of the plurality of gate lines may be electrically connected to each other.

In one exemplary embodiment the data lines include a plurality of groups of data lines wherein each group of data lines includes a first, second, third and fourth data line and the group of data lines is disposed between adjacent columns of pixels.

In one exemplary embodiment within each group the third data line is disposed to the left of the fourth data line, the fourth data line is disposed to the left of the first data line and the first data line is disposed to the left of the second data line.

In one exemplary embodiment a method of driving for a liquid crystal display that comprises a plurality of gate lines and a plurality of data lines which intersect the gate lines, the method may comprise applying the same gate signal to at least of two adjacent gate lines; and applying data signals to the data lines, respectively, wherein the data signal that is applied to one data line has the same polarity, wherein the data signals that are applied to two adjacent data lines have different polarities each other.

BRIEF DESCRIPTION OF THE DRAWINGS

The present invention will become more apparent by describing exemplary embodiments thereof in more detail with reference to the accompanying drawings, in which.

DETAILED DESCRIPTION OF THE INVENTION

Figure 1:
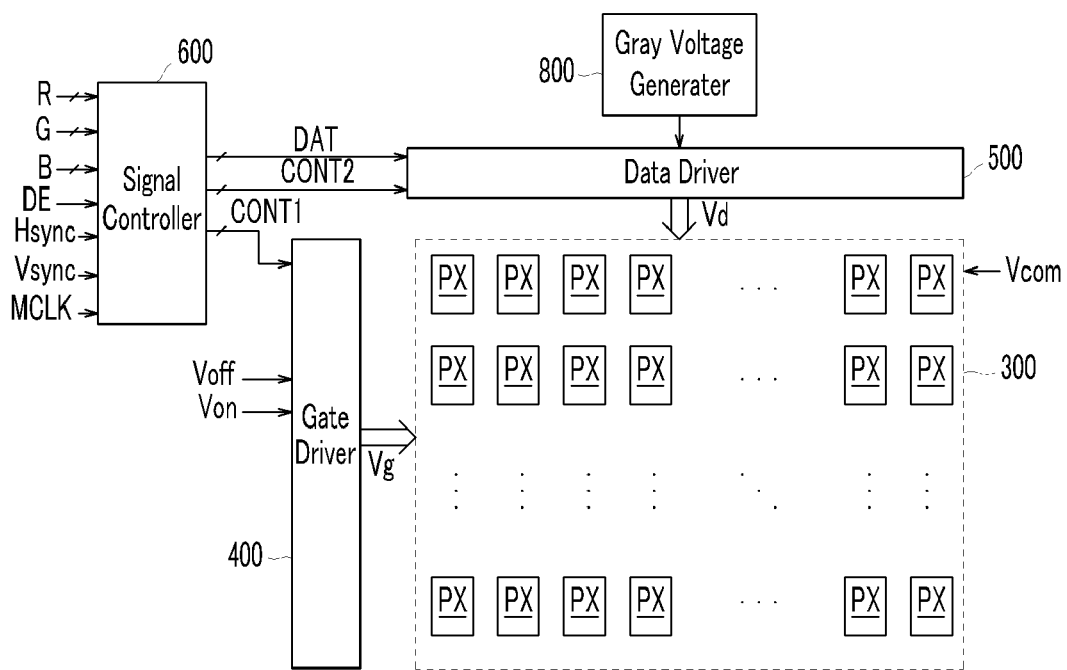
FIG. 1 is a block diagram of an exemplary embodiment of a liquid crystal display ("LCD") according to the present invention.

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Now, referring to FIGS. 1 and 2, an exemplary embodiment of a liquid crystal display ("LCD") according to the present invention will be described.

Figure 2:
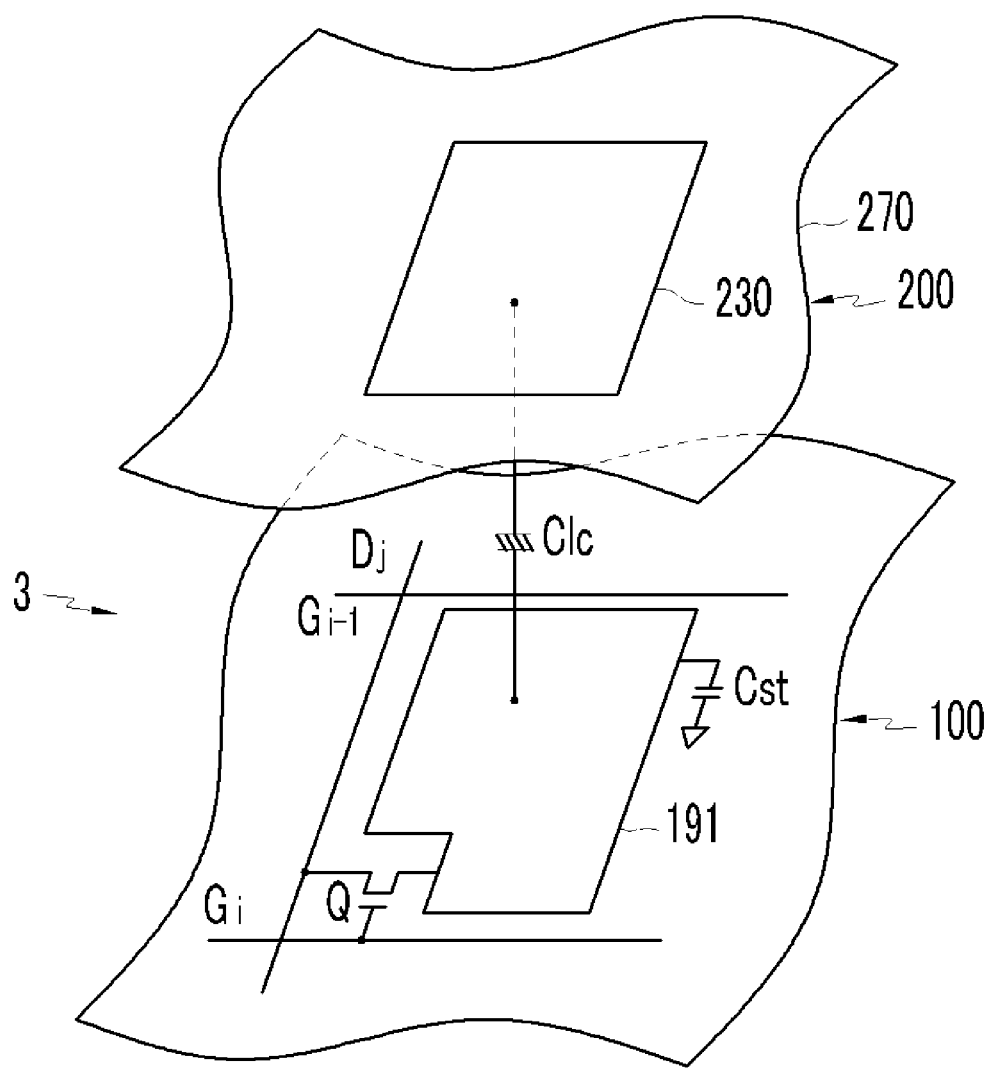
FIG. 2 is an equivalent circuit diagram of an exemplary embodiment of a pixel of an LCD according to the present invention.
Figure 3:
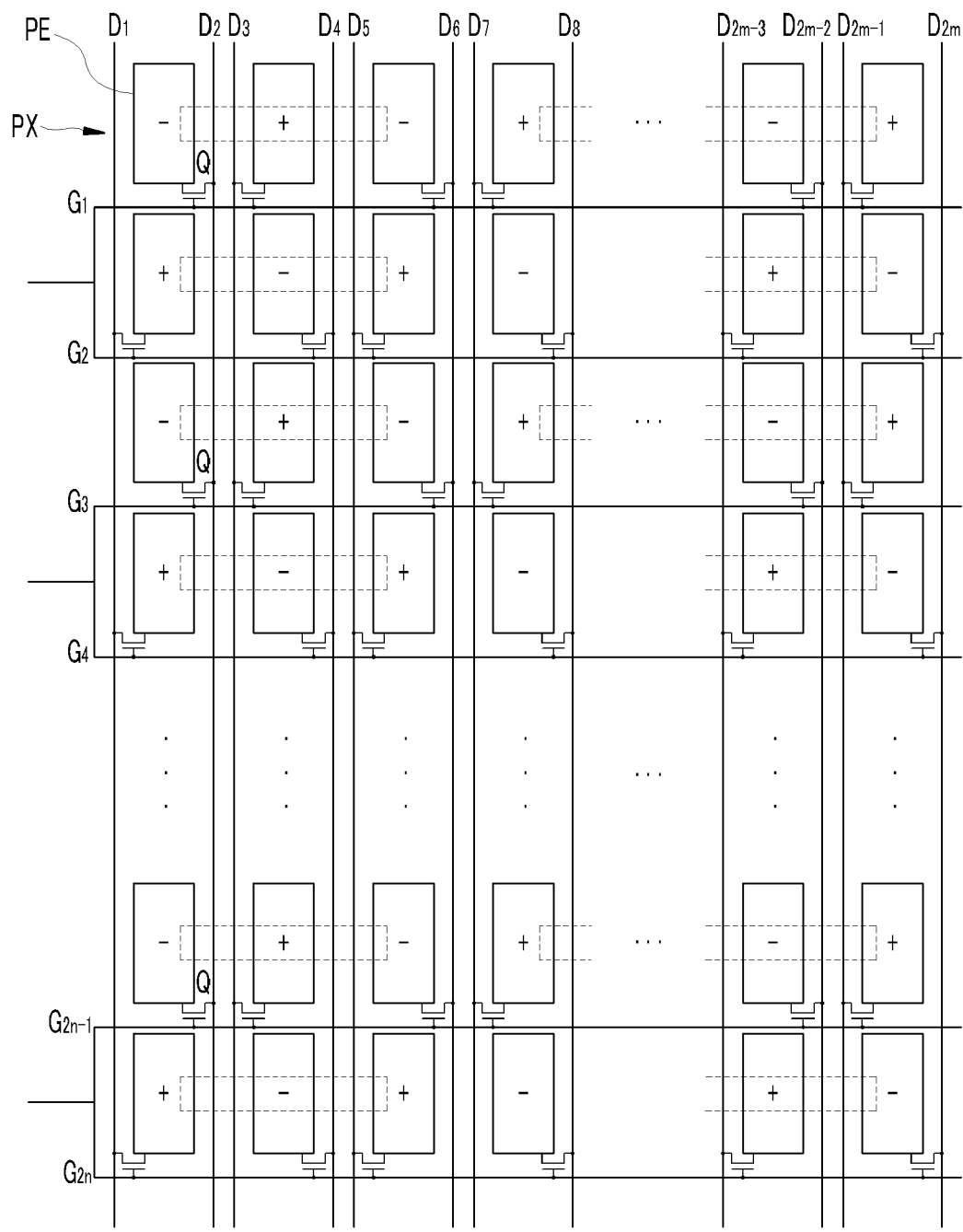
FIG. 3 is a top plan view layout illustrating an exemplary embodiment of a spatial arrangement of pixels and signal lines of an LCD according to the present invention.

FIG. 1 is a block diagram of an exemplary embodiment of an LCD according to the present invention, FIG. 2 is an equivalent circuit diagram of an exemplary embodiment of a pixel of an LCD according to the present invention, and FIG. 3 is a top plan view layout illustrating an exemplary embodiment of a spatial arrangement of pixels and a signal lines of an LCD according to the present invention.

Referring to FIGS. 1 and 2, the exemplary embodiment of an LCD according to the present invention includes a liquid crystal panel assembly 300, a gate driver 400 and a data driver 500 which are connected thereto, a gray voltage generator 800 which is connected to the data driver 500, and a signal controller 600 for controlling them.

The liquid crystal panel assembly 300 includes a plurality of pixels PX which are arranged substantially in a matrix form, and signal lines $G_i$, $G_{i-1}$, and $D_j$ are connected to each pixel. The liquid crystal panel assembly 300 includes lower and upper panels 100 and 200 which are disposed substantially opposite to each other and a liquid crystal layer 3 which is interposed therebetween, as seen in the structural view of FIG. 2.

Referring to FIGS. 1 and 2, the signal lines $G_i$, $G_{i-1}$, and $D_j$ include a plurality of gate lines $G_i$ and $G_{i-1}$ for transmitting gate signals (also referred to as "scanning signals") and a plurality of data lines $D_j$ for transmitting data signals. The gate lines $G_i$ and $G_{i-1}$ extend in approximately a row direction and are substantially parallel to each other, and the data lines $D_j$ extend in approximately a column direction and are substantially parallel to each other.

Each pixel PX includes a switching element Q which is connected to the signal lines Gi and Dj, and a liquid crystal capacitor Clc and a storage capacitor Cst which are connected thereto. Alternative exemplary embodiments include configurations wherein the storage capacitor Cst may be omitted.

In one exemplary embodiment, the switching element Q is a three terminal element such as a thin film transistor which is provided on the lower panel 100, and a control terminal thereof is connected to the gate line Gi, an input terminal thereof is connected to the data line Dj, and an output terminal thereof is connected to the liquid crystal capacitor Clc and the storage capacitor Cst.

The liquid crystal capacitor Clc includes a pixel electrode 191 disposed on the lower panel 100 and a common electrode 270 disposed on the upper panel 200 as two terminals thereof, and the liquid crystal layer 3 between two electrodes 191 and 270 functions as a dielectric material. The pixel electrode 191 is connected to the switching element Q, and the common electrode 270 is formed on substantially an entire surface of the upper panel 200 and receives a common voltage Vcom. Alternative exemplary embodiments include configurations wherein the common electrode 270 may be provided on the lower panel 100, and in such an exemplary embodiment, at least one of the two electrodes 191 and 270 can be formed in a line shape or a bar shape.

The storage capacitor Cst, which may supplement the liquid crystal capacitor Clc, is formed to overlap a separate signal line (not shown) and the pixel electrode 191 which are provided on the lower panel 100 with an insulator interposed therebetween. A predetermined voltage such as a common voltage Vcom is applied to the separate signal line. Alternative exemplary embodiments include configurations wherein the storage capacitor Cst may be formed to overlap the pixel electrode 191 and a previous gate line $G_{i-1}$ with an insulator interposed therebetween.

Referring to FIG. 3, the exemplary embodiment of a liquid crystal panel assembly 300 according to the present invention includes a plurality of pixels PX which are arranged substantially in a matrix form. Each pixel PX includes a pixel electrode PE and a switching element Q which is connected to the pixel electrode PE. A plurality of gate lines G1, G2, G3, G4 . . . G2n-1, and G2n which extend in a substantially horizontal direction are arranged between pixel rows, and a plurality of pairs of data lines $D_1$, $D_2$, $D_3$, $D_4$, $D_5$, $D_6$, $D_7$, $D_8$, . . . $D_{2m-3}$, $D_{2m-2}$, $D_{2m-1}$, and $D_{2m}$ which extend in a substantially vertical direction are arranged at the left side and the right side of the pixels PX. The switching elements Q are connected to the gate lines $G_1$-$G_{2n}$ and the data lines $D_1$-$D_{2m}$.

Each switching element Q of a neighboring pixel PX in a row direction is connected to a different one of a left data line and a right data line $D_1$, $D_2/D_3$, $D_4/D_5$, $D_6/D_7$, $D_8/$ . . . $/D_{2m-3}$, $D_{2m-2}/D_{2m-1}$, and $D_{2m}$ e.g., if a switching element Q of a first pixel is connected to a data line on the left side of the first pixel then a switching element Q of a second pixel, which is immediately adjacent the first pixel in a row direction, will be connected to a data line on the right side of the second pixel. Further, each switching element Q of a neighboring pixel PX in a column direction is connected to a different one of a left data line and a right data line $D_1$, $D_2/D_3$, $D_4/D_5$, $D_6/D_7$, $D_8/$ . . . $/D_{2m-3}$, $D_{2m-2}/D_{2m-1}$, and $D_{2m}$ e.g., if a switching element Q of a first pixel is connected to a data line on the left side of the first pixel then a switching element Q of a second pixel, which is immediately adjacent the first pixel in a column direction, will be connected to a data line on the right side of the second pixel. That is, the switching elements Q are alternately positioned at the right side or the left side of a plurality of pixel electrodes PE which are disposed in the same row, and the switching elements Q is alternately positioned at the right side or the left side of a plurality of pixel electrodes PE which are disposed in the same column.

In the exemplary embodiment of a liquid crystal panel assembly 300 shown in FIG. 3, two neighboring gate lines $G_1$, $G_2/G_3$, $G_4/$ . . . $/G_{2n-1}$, and $G_{2n}$ are connected to each other and receive the same gate signal from the gate driver 400.

Polarities of data voltages flowing to data lines $D_1$, $D_2/D_3$, $D_4/D_5$, $D_6/D_7$, $D_8/$ . . . $/D_{2m-3}$, $D_{2m-2}/D_{2m-1}$, and $D_{2m}$ which are respectively positioned at the right side and the left side of the pixels PX are opposite to each other e.g., when the polarity of a data voltage flowing to the data lines $D_1$, $D_3$, $D_5$, $D_7$ . . . $D_{2m-3}$, and $D_{2m-1}$ which are positioned at the left side of the pixel electrodes PE is positive (+), and the polarity of a data voltage flowing to the data lines $D_2$, $D_4$, $D_8$ . . . $D_{2m-2}$, and $D_{2m}$ which are positioned at the right side of the pixel electrodes PE is negative (−). The polarities applied to the data lines may be inverted from one frame to the next in order to prolong the lifetime of the liquid crystal molecules, e.g., when the data voltage applied to the data lines on the left side is positive in a first frame, the data voltage applied to the same data lines will be negative in a second frame following the first.

Accordingly, polarities of neighboring pixels PX in a row direction are opposite to each other, and polarities of neighboring pixels PX in a column direction are also opposite to each other.

In order to represent colors in the display, each pixel PX inherently displays one of the primary colors (spatial division) or each pixel PX sequentially and alternately displays the primary colors (temporal division), and a desired color is achieved by the spatial or temporal combination of the primary colors. One exemplary embodiment of a set of the primary colors includes red, green, and blue colors. FIG. 2 shows as an example of spatial division in which each pixel PX is provided with a color filter 230 in a region of the upper panel 200 corresponding to the pixel electrode 191 for displaying one of the primary colors. Alternative exemplary embodiments include configurations wherein the color filter 230 may be formed on or under the pixel electrode 191 of the lower panel 100.

At least one polarizer (not shown) for polarizing light is attached to an external surface of the liquid crystal panel assembly 300.

Referring again to FIG. 1, the gray voltage generator 800 generates all gray voltages or a fixed number of gray voltages (hereinafter referred to as a "reference gray voltages") which are related to transmittance of the pixel PX. However, in an alternative exemplary embodiment the gray voltage generator 800 may generate only a given number of gray voltages (referred to as reference gray voltages) instead of generating all of the gray voltages. The (reference) gray voltages can include a voltage having a positive value and a negative value with respect to a common voltage Vcom, this is also referred to as polarity inversion.

The gate driver 400 is connected to the gate lines $G_1$-$G_{2n}$ of the liquid crystal panel assembly 300 and synthesizes a gate-on voltage Von and a gate-off voltage Voff to generate gate signals Vg, which are applied to the gate lines $G_1$-$G_{2n}$.

The data driver 500 is connected to the data lines $D_1$-$D_{2m}$ of the liquid crystal panel assembly 300 and selects a gray voltage from the gray voltage generator 800 to apply the voltage as a data voltage to the data lines $D_1$-$D_{2m}$. However, in the exemplary embodiment wherein the gray voltage generator 800 provides only a fixed number of reference gray voltages rather than all gray voltages, the data driver 500 divides the reference gray voltages and selects a desired data voltage therefrom.

The signal controller 600 controls the gate driver 400 and the data driver 500.

Exemplary embodiments include configurations wherein each of the driving devices 400, 500, 600, and 800 may be directly mounted on the liquid crystal panel assembly 300 in the form of at least one integrated circuit ("IC") chip, may be attached to the liquid crystal panel assembly 300 in the form of a tape carrier package ("TCP") by being mounted on a flexible printed circuit film (not shown), or may be mounted on a separate printed circuit board ("PCB") (not shown). Alternative exemplary embodiments include configurations wherein the driving devices 400, 500, 600, and 800 along with the signal lines $G_1$-$G_{2n}$ and $D_1$-$D_{2m}$ and the thin film transistor switching element Q may be integrated with the liquid crystal panel assembly 300. Furthermore, alternative exemplary embodiments include configurations wherein the driving devices 400, 500, 600, and 800 may be integrated in a single chip, and in such an exemplary embodiment, at least one of them or at least one circuit element of the driving devices 400, 500, 600 and 800 may be disposed outside of the single chip.

Now, referring to FIGS. 4A and 4B, spatial arrangements of a data line and a driver of a liquid crystal display according to several exemplary embodiments of the present invention will be described.

Figure 4A:
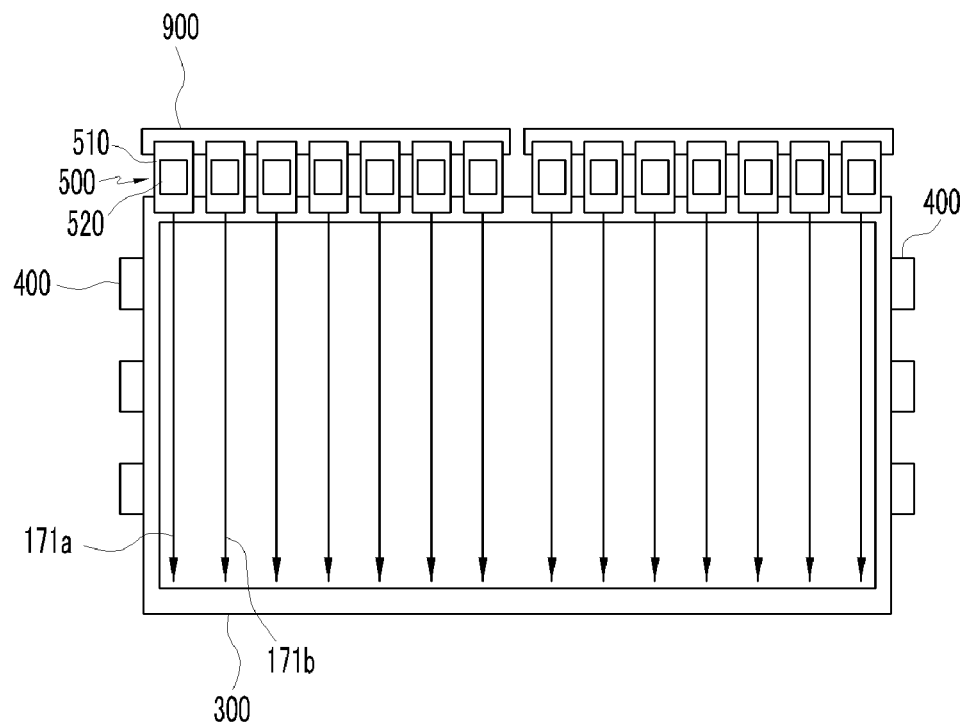
FIG. 4A is a top plan view layout illustrating an exemplary embodiment of a spatial arrangement of signal lines and drivers of an LCD according to the present invention.
Figure 4B:
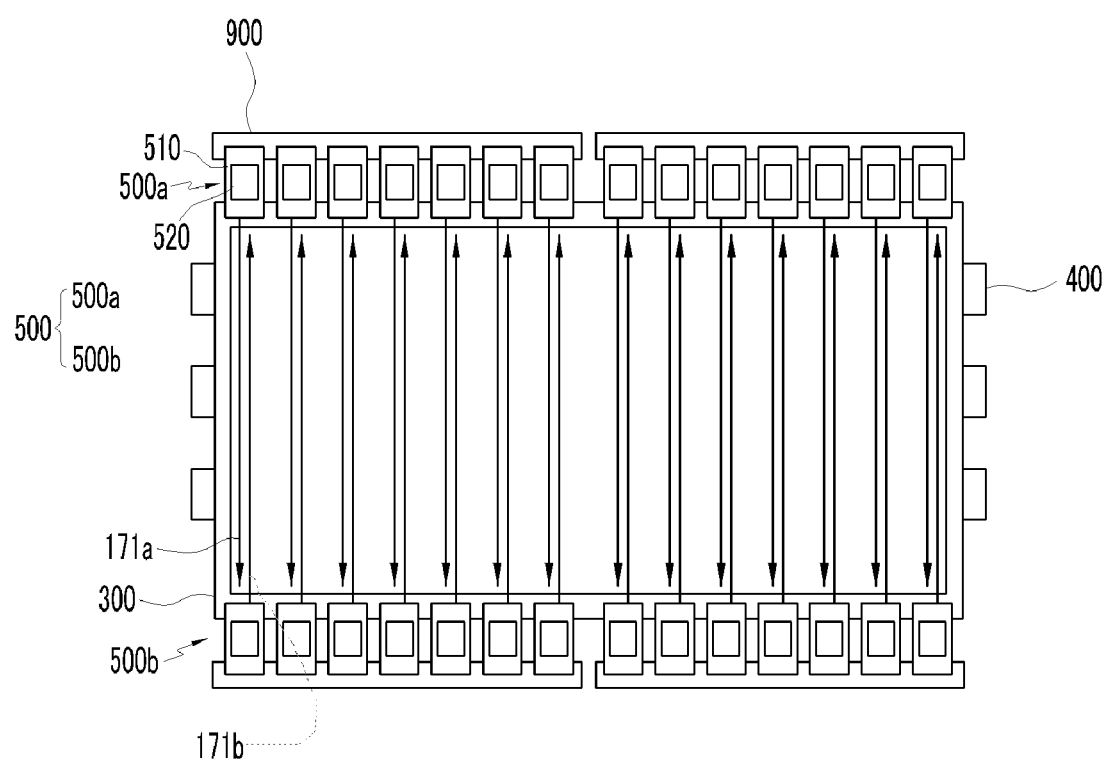
FIG. 4B is a top plan view layout illustrating another exemplary embodiment of a spatial arrangement of signal lines and drivers of an LCD according to the present invention.

FIG. 4A is a top plan view layout illustrating an exemplary embodiment of a special arrangement of data lines and drivers of an exemplary embodiment of an LCD according to the present invention, and FIG. 4B is a top plan view layout illustrating another exemplary embodiment of a spatial arrangement of data lines and drivers of an exemplary embodiment of an LCD according to the present invention.

Referring to FIG. 4A, the exemplary embodiment of an LCD according to the present invention includes a liquid crystal panel assembly 300, a gate driver 400 which may be attached to either the left side or the right side, or both, of the liquid crystal panel assembly 300, and a data driver 500 which is attached to an upper part of the liquid crystal panel assembly 300.

The data driver 500 includes a driving circuit chip 520 which is provided on a flexible base film 510 and is connected to a PCB 900 and a liquid crystal panel assembly 300.

Referring to FIG. 4B, the exemplary embodiment of an LCD according to the present invention also includes a liquid crystal panel assembly 300, a gate driver 400 which is attached to the left side or the right side, or both, of the liquid crystal panel assembly 300, and a data driver 500 which is attached to the liquid crystal panel assembly 300.

However, unlike of the exemplary embodiment shown in FIG. 4A, the data driver 500 includes a first data driver 500a which is attached to an upper part of the liquid crystal panel assembly 300 and a second data driver 500b which is attached to a lower part of the liquid crystal panel assembly 300. Accordingly, a left data line 171a of a pair of data lines 171a and 171b is connected to the first data driver 500a to receive a data voltage, and a right data line 171b of the pair of data lines 171a and 171b is connected to the second data driver 500b to receive a data voltage. Alternative exemplary embodiments include configurations wherein the left data line 171a is connected to the second data driver 500b and the right data line 171b is connected to the first data driver 500a.

Referring to FIGS. 4A and 4B, regardless of a size of the liquid crystal panel assembly 300, a plurality of pairs of data lines 171a and 171b can be formed while sustaining an interval between the data lines 171a and 171b.

Now, the operation of the liquid crystal display will be described in detail.

The signal controller 600 receives input image signals R, G, and B and an input control signal for controlling the display of the input image signals R, G, and B from an external graphics controller (not shown). Exemplary embodiments of the input control signals include a vertical synchronization signal Vsync, a horizontal synchronizing signal Hsync, a main clock signal MCLK, and a data enable signal DE.

The signal controller 600 appropriately processes the input image signals R, G, and B based on the input image signals R, G, and B and the input control signals according to an operating condition of the liquid crystal panel assembly 300, generates a gate control signal CONT1 and a data control signal CONT2, and then sends the gate control signal CONT1 to the gate driver 400 and sends the data control signal CONT2 and the processed image signal DAT to the data driver 500.

The gate control signal CONT1 includes a scanning start signal STV for instructing the scanning start and at least one clock signal for controlling an output period of a gate-on voltage Von.

The data control signal CONT2 includes a horizontal synchronization start signal STH for signaling the beginning of a transmission of an image data for one row (set) of pixels PX, and a load signal LOAD and a data clock signal HCLK for applying a data signal to the data lines $D_1$-$D_m$. The data control signal CONT2 may further include an inversion signal RVS for inverting voltage polarity of a data signal with respect to a common voltage Vcom (hereinafter, "voltage polarity of a data signal with respect to a common voltage" is referred to as "polarity of a data signal").

The data driver 500 receives a digital image signal DAT for one row (set) of pixels PX according to the data control signal CONT2 from the signal controller 600, converts the digital image signal DAT to an analog data signal by selecting a gray voltage corresponding to each digital image signal DAT, and then applies the analog data signal to the corresponding data lines $D_1$-$D_{2m}$.

The gate driver 400 applies a gate-on voltage Von to the gate lines $G_1$-$G_{2n}$ in response to the gate control signal CONT1 from the signal controller 600 to turn on the switching element Q which is connected to the gate lines $G_1$-$G_{2n}$. In the exemplary embodiments of a liquid crystal panel assembly 300 shown in FIG. 3, since two neighboring gate lines $G_1$, $G_2$/$G_3$, $G_4$/ . . . /$G_{2n-1}$, and $G2n$ are connected to each other, two switching elements Qs which are connected to the two neighboring gate lines $G_1$, $G_2$/$G_3$, $G_4$/ . . . /$G_{2n-1}$, and $G_{2n}$ are simultaneously turned on. Accordingly, a data signal which is applied to the data lines $D_1$-$D_{2m}$ is applied to the corresponding pixel PX through the turned-on switching element Q.

The difference between the common voltage Vcom and a voltage of the data signal which is applied to the pixel PX is represented as a charge voltage, e.g., a pixel voltage is charged in the liquid crystal capacitor Clc. Liquid crystal molecules change their arrangement according to a magnitude of the pixel voltage, so that polarization of light passing through the liquid crystal layer 3 changes. The change in the polarization correlates to a change in transmittance of light through the polarizer which is attached to the liquid crystal panel assembly 300.

By repeating the process with a unit of one horizontal period (referred to as "1H", the same as one period of a horizontal synchronizing signal Hsync and a data enable signal DE), a gate-on voltage Von is sequentially applied to all the gate lines $G_1$-$G_{2n}$, and thus a data signal is applied to all pixels PX, so that an image of one frame is displayed.

A state of an inversion signal RVS which is applied to the data driver 500 is controlled so that a next frame starts when one frame ends, and the polarity of a data signal which is applied to each pixel PX is opposite to the polarity in a previous frame; this type of signal inversion is called "frame inversion". Alternative exemplary embodiments include configurations wherein the inversion signal RVS may control the polarity of a data signal flowing through one data line even within one frame, this type of signal inversion is called row inversion or dot inversion, or the polarities of the data signals which are applied to one pixel row may be different from each other, this type of signal inversion is called column inversion or dot inversion.

Now, referring to FIGS. 5 to 7, the exemplary embodiment of a liquid crystal panel assembly 300 according to the present invention will be described in detail.

Figure 5:
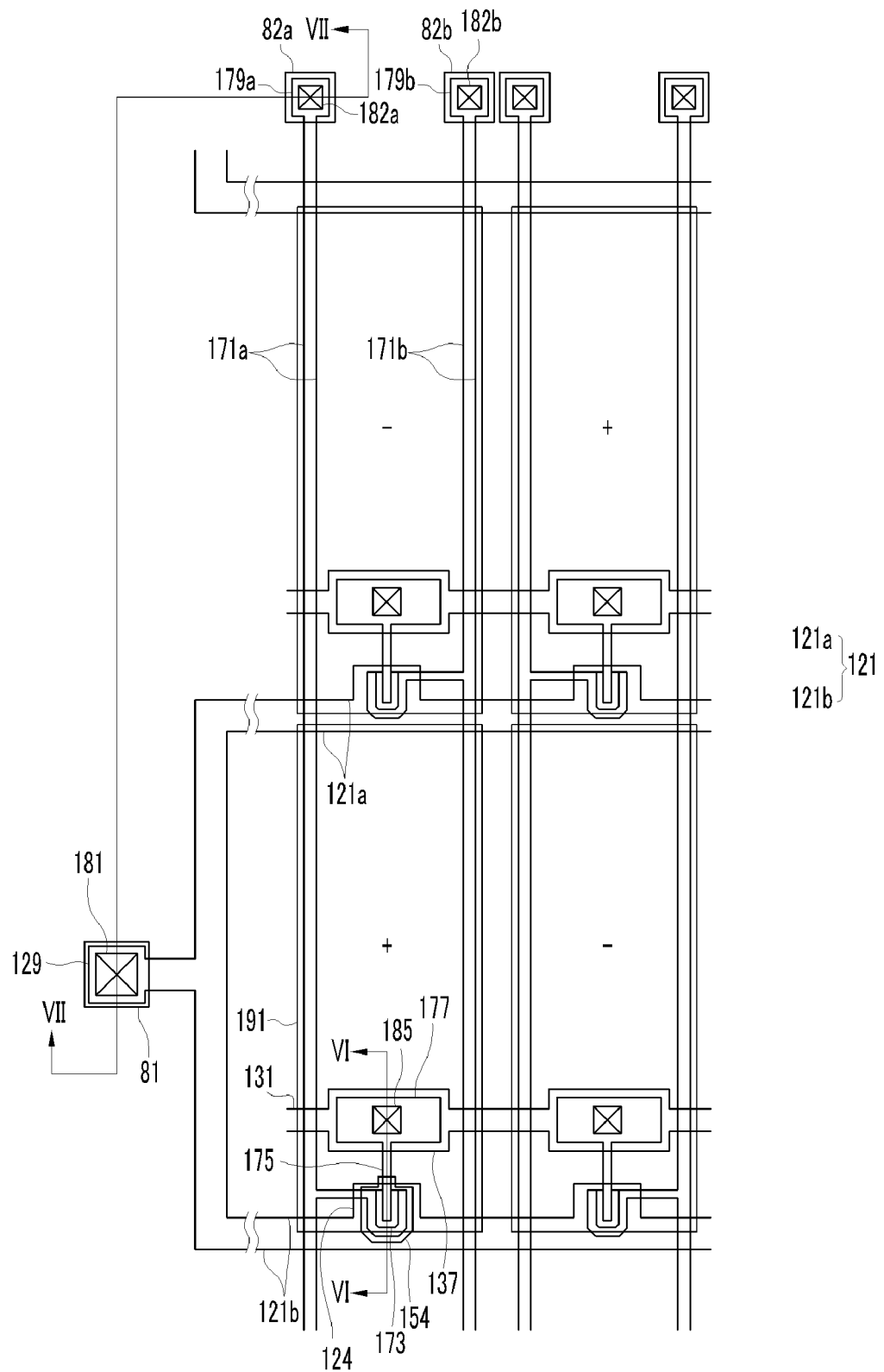
FIG. 5 is a top plan layout view of an exemplary embodiment of a liquid crystal panel assembly according to the present invention.
Figure 6:
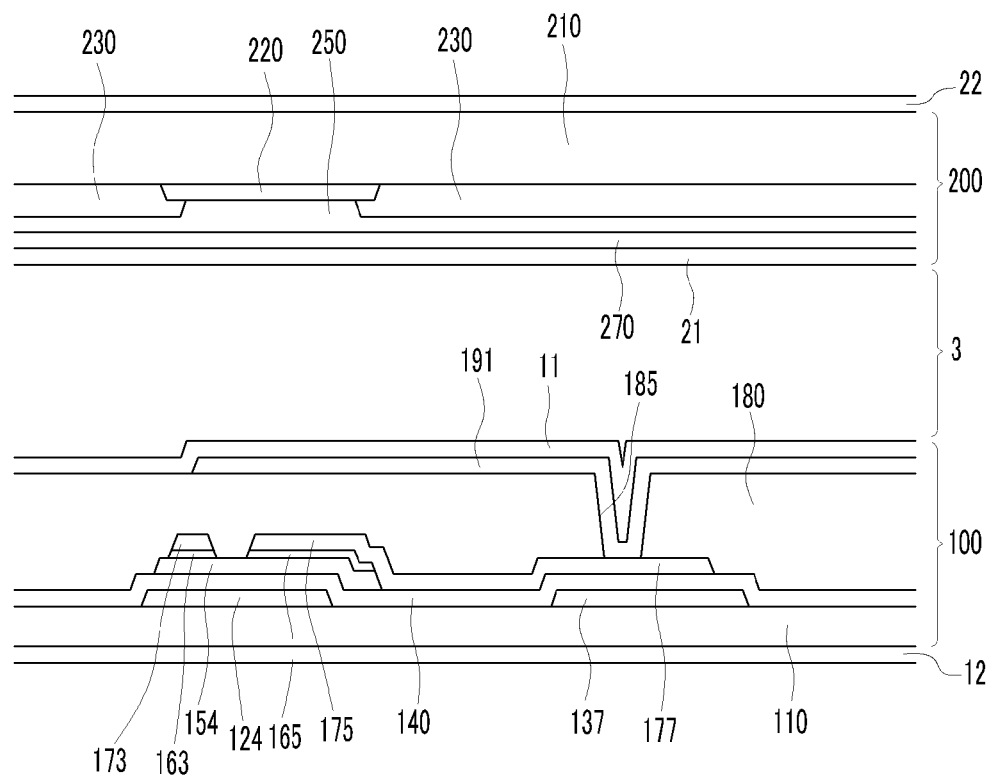
FIGS. 6 and 7 are cross-sectional views of the exemplary embodiment of a liquid crystal panel assembly shown in FIG. 5 taken along lines VI-VI and VII-VII, respectively.
Figure 7:
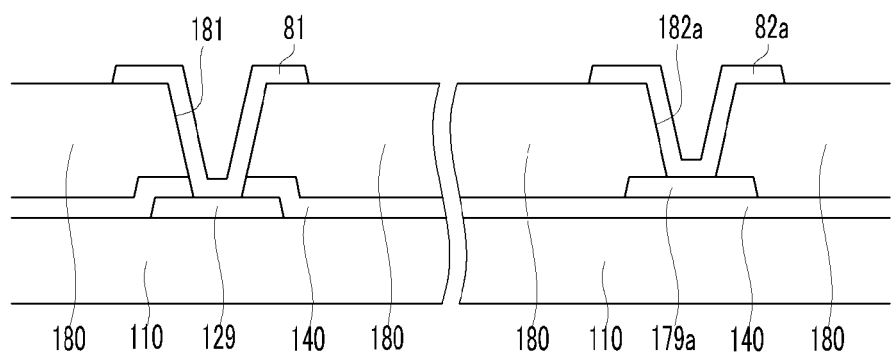

FIG. 5 is a top plan layout view of an exemplary embodiment of a liquid crystal panel assembly according to the present invention, and FIGS. 6 and 7 are cross-sectional views of the exemplary embodiment of a liquid crystal panel assembly shown in FIG. 5 taken along lines VI-VI and VII-VII, respectively.

First, the lower panel 100 is described.

A plurality of gate lines 121 and a plurality of storage electrode lines 131 are formed on the insulation substrate 110, exemplary embodiments of which may be made of transparent glass or plastic.

Each gate line 121 transmits a gate signal and according to the present exemplary embodiment generally extends in a transverse direction. Each gate line 121 includes a plurality of gate electrodes 124 which are vertically protruded therefrom and a wide end part 129 for connecting to other layers or an external driving circuit (not shown). In the alternative exemplary embodiment wherein a gate driving circuit is integrated with the substrate 110, the gate lines 121 extend to connect to the gate driving circuit.

The storage electrode lines 131 receive a predetermined voltage and extend substantially parallel to the gate lines 121. According to the present exemplarily embodiment each storage electrode line 131 is positioned between two adjacent gate lines 121 and is positioned closer to a lower one of the two gate lines 121. Each storage electrode line 131 includes a storage electrode 137 which extends vertically from the electrode line 131. However, the shape and disposition of the storage electrode lines 131 can be variously modified.

Exemplary embodiments of the gate lines 121 and the storage electrode lines 131 may be made of aluminum metals such as aluminum (Al) or an aluminum alloy, silver metals such as silver (Ag) or a silver alloy, copper metals such as copper (Cu) or a copper alloy, molybdenum metals such as molybdenum (Mo) or a molybdenum alloy, chromium (Cr), titanium (Ti), thallium (Ta), and various other similar materials. Alternative exemplary embodiments include configurations wherein the gate lines 121 and the storage electrode lines 131 have a multi-layered structure including two conductive layers (not shown) which have different physical properties. In such an alternative exemplary embodiment one of the two conductive layers is made of metals having low resistivity to reduce a signal delay or voltage drop, exemplary embodiments of which include aluminum metals, silver metals, or copper metals. In such an alternative exemplary embodiment the other conductive layer is made of a material with excellent physical, chemical, and electrical contact characteristics with respect to other materials, particularly with indium tin oxide ("ITO") and indium zinc oxide ("IZO"), such as molybdenum metals, chromium, titanium, or thallium. Exemplary embodiments of such a combination may include a chromium lower layer and an aluminum (or aluminum alloy) upper layer, and an aluminum (or aluminum alloy) lower layer and a molybdenum (or molybdenum alloy) upper layer. However, the gate lines 121 and the storage electrode lines 131 may be made of various metals or conductors and the present invention is not limited to the above-described exemplary embodiments.

The lateral sides of the gate lines 121 and the storage electrode lines 131 are inclined with respect to a surface of the substrate 110, and in one exemplary embodiment an inclination angle thereof is within a range of about 30° to about 80°.

A gate insulating layer 140, exemplary embodiments of which may be made of silicon nitride ("SiNx") or silicon oxide ("SiOx"), is formed on the gate lines 121 and the storage electrode lines 131.

A plurality of semiconductor islands 154, exemplary embodiments of which are made of hydrogenated amorphous silicon ("a-Si"), polysilicon, or various other similar materials, are formed on the gate insulating layer 140. Each semiconductor 154 is positioned on a gate electrode 124.

A plurality of ohmic contact islands 163 and 165 are formed on the semiconductors 154. Exemplary embodiments of the ohmic contacts 163 and 165 are made of a material such as n+ hydrogenated amorphous silicon in which an n-type impurity such as phosphorus is doped with high concentration, or the ohmic contacts 163 and 165 may be made of silicide. The ohmic contacts 163 and 165 are formed in pairs and disposed on the semiconductors 154.

The lateral sides of the semiconductor 154 and the ohmic contacts 163 and 165 are also inclined with respect to a surface of the substrate 110, and in one exemplary embodiment an inclination angle thereof is in a range of about 30° to about 80°.

A plurality of pairs of first and second data lines 171a and 171b and a plurality of drain electrodes 175 are formed on the ohmic contacts 163 and 165 and the gate insulating layer 140.

The data lines 171a and 171b transmit data signals, generally extend in a substantially vertical direction, and intersect the gate lines 121 and the storage electrode lines 131. Each of the data lines 171a and 171b includes a plurality of source electrodes 173 which extend toward the gate electrodes 124 and wide end parts 179a and 179b for connecting to other layers or an external driving circuit (not shown). In the alternative exemplary embodiment wherein a data driving circuit is integrated with the substrate 110, the data lines 171 extend to connect to the data driving circuit.

Each drain electrode 175 is separated from a data line 171, and faces a source electrode 173 with respect to a gate electrode 124. Each drain electrode 175 includes one wide end part and another bar-type end part. The wide end part overlaps with the storage electrode 137, and a part of the bar-type end part is surrounded by the source electrode 173 which is bent in a U-shape.

One gate electrode 124, one source electrode 173, and one drain electrode 175 along with the semiconductor 154 constitute a thin film transistor ("TFT"), and a channel of the TFT is formed in the semiconductor 154 between the source electrode 173 and the drain electrode 175.

In one exemplary embodiment the data lines 171a and 171b and the drain electrode 175 are made of a refractory metal such as molybdenum, chromium, tantalum, and titanium, or alloys thereof. In alternative exemplary embodiments the data lines 171a and 171b and the drain electrode 175 can have a multi-layered structure including a refractory metal layer (not shown) and a low resistance conductive layer (not shown). One exemplary embodiment of a multi-layered structure includes a dual layer of a chromium or molybdenum (or molybdenum alloy) lower layer and an aluminum (or aluminum alloy) upper layer, and a triple layer of a molybdenum (or molybdenum alloy) lower layer, an aluminum (or aluminum alloy) middle layer, and a molybdenum (or molybdenum alloy) upper layer. However, the data lines 171a and 171b and the drain electrode 175 may be made of various metals or conductors and the present invention is not limited to the above-described exemplary embodiments.

In one exemplary embodiment the lateral sides of the data lines 171a and 171b and the drain electrode 175 are also inclined in a range of about 30° to about 80° to the surface of the substrate 110.

The ohmic contacts 163 and 165 are disposed between the lower semiconductors 154 and the upper data lines 171a and 171b and drain electrodes 175, and lower contact resistance therebetween.

A passivation layer 180 is formed on the data lines 171a and 171b and the drain electrode 175, and on the exposed portion of the semiconductor 154. In one exemplary embodiment the passivation layer 180 is made of an inorganic insulator and an organic insulator, and may have a flat surface. Exemplary embodiments of the inorganic insulator include silicon nitride or silicon oxide. In one exemplary embodiment the organic insulator has photosensitivity and a dielectric constant of about 4.0 or less. In alternative exemplary embodiment the passivation layer 180 may have a dual-layered structure of a lower inorganic layer and an upper organic layer so as to not to cause damage to the exposed portion of the semiconductor 154 while still possessing the excellent insulation properties of the organic layer.

A plurality of contact holes 182a, 182b, and 185 for exposing each of the end parts 179a and a79b of the data lines 171a and 171b and the drain electrodes 175 are formed on the passivation layer 180, and a plurality of contact holes 181 for exposing the end parts 129 of the gate lines 121 are formed on the passivation layer 180 and the gate insulation layer 140.

A plurality of pixel electrodes 191 and a plurality of contact assistants 81, 82a, and 82b are formed on the passivation layer 180. In one exemplary embodiment the plurality of pixel electrodes 191 and the plurality of contact assistants 81, 82a, and 82b may be made of a transparent conductive material such as ITO or IZO, or a reflective metal such as aluminum, silver, chromium, or alloys thereof or other similar materials.

Each pixel electrode 191 is physically and electrically connected to a drain electrode 175 through a contact hole 185 and receives a data voltage from a drain electrode 175. The pixel electrodes 191 to which the data voltage is applied along with the common electrode 270 of the other display panel 200 to which the common voltage Vcom is applied, generate an electric field and thus determines an orientation of the liquid crystal molecules of the liquid crystal layer 3 between the two electrodes 191 and 270. Polarization of light passing through the liquid crystal layer 3 changes according to the determined orientation of the liquid crystal molecules. The pixel electrode 191 and the common electrode 270 form the liquid crystal capacitor Clc which sustains an applied voltage even after a TFT is turned off.

The pixel electrode 191 and the drain electrode 175 which is connected thereto overlap with the storage electrode 137 and the storage electrode line 131. A capacitor which is formed as the pixel electrode 191 and the drain electrode 175 which is electrically connected thereto overlap with the storage electrode line 131 is referred to as a storage capacitor, and the storage capacitor Cst enhances the voltage storage ability of the liquid crystal capacitor.

In one exemplary embodiment the pixel electrode 191 overlaps with the first and second data lines 171a and 171b. In such an exemplary embodiment parasitic capacitance may be generated between the pixel electrode 191 and each of the data lines 171a and 171b. However, as described above, because data voltages having different polarities flow to the first and second data lines 171a and 171b, even if parasitic capacitance is generated between the pixel electrode 191 and each of the data lines 171a and 171b, the parasitic capacitance is offset. Accordingly, vertical crosstalk is prevented from being generated and an aperture ratio of the display panel can be improved.

The contact assistants 81, 82a, and 82b are connected to the end parts 129 of the gate lines 121 and the end parts 179a and 179b of the data lines 171a and 171b through the contact holes 181, 182a, and 182b. The contact assistants 81, 82a, and 82b supplement an adhesive property between the end parts 129 of the gate lines 121 and the end parts 179a and 179b of the data lines 171a and 171b and an external device, and protect them from abrasion or other damage.

Now, the upper panel 200 will be described.

A light blocking member 220 is formed on an insulation substrate 210 exemplary embodiments of which are made of transparent glass or plastic. The light blocking member 220 is also referred to as a black matrix, and it blocks light leakage. The light blocking member 220 includes a relatively thin part, also called a line part, corresponding to the data lines 171a and 171b and a relatively wider part, also called a surface part, corresponding to the TFT, and it blocks light leakage between the pixel electrodes 191 and defines an opening region facing the pixel electrode 191. Furthermore, the light blocking member 220 faces the pixel electrodes 191 and may have a plurality of openings (not shown) having a shape almost identical to the pixel electrodes 191.

A plurality of color filters 230 are also formed on the substrate 210. The color filter 230 is disposed substantially within an area which is surrounded by the light blocking member 230 and extends in a vertical direction along a column of the pixel electrodes 191. In one exemplary embodiment each color filter 230 can display one of three primary colors of red, green, and blue.

An overcoat 250 is formed on the color filter 230 and the light blocking member 220. The overcoat 250 can be made of an insulator, exemplary embodiments of which include organic insulators, and it prevents the color filter 230 from being exposed and provides a flat surface. Exemplary embodiments include configurations wherein the overcoat 250 may be omitted.

The common electrode 270 is formed on the overcoat 250. In one exemplary embodiment the common electrode 270 is made of a transparent conductor such as ITO and IZO.

Alignment layers 11 and 21 are coated on an inner side of the display panels 100 and 200, respectively, and may be horizontal alignment layers.

Polarizers 12 and 22 are provided at an outer side of the display panels 100 and 200, and in one exemplary embodiment transmissive axes of the two polarizers 12 and 22 are orthogonal to each other and one transmissive axis is parallel to the gate lines 121a and 121b.

The liquid crystal display includes a backlight unit (not shown) for supplying light to the polarizers 12 and 22, the display panels 100 and 200, and the liquid crystal layer 3.

The liquid crystal layer 3 has a negative dielectric anisotropy, and in a state where an electric field does not exist, liquid crystal molecules of the liquid crystal layer 3 are aligned so that long axes thereof are horizontal with respect to surfaces of the two display panels 100 and 200. Accordingly, incident light is blocked without passing through both the orthogonal polarizers 12 and 22.

Now, referring to FIG. 8, a liquid crystal panel assembly according to another exemplary embodiment of the present invention will be described in detail.

Figure 8:
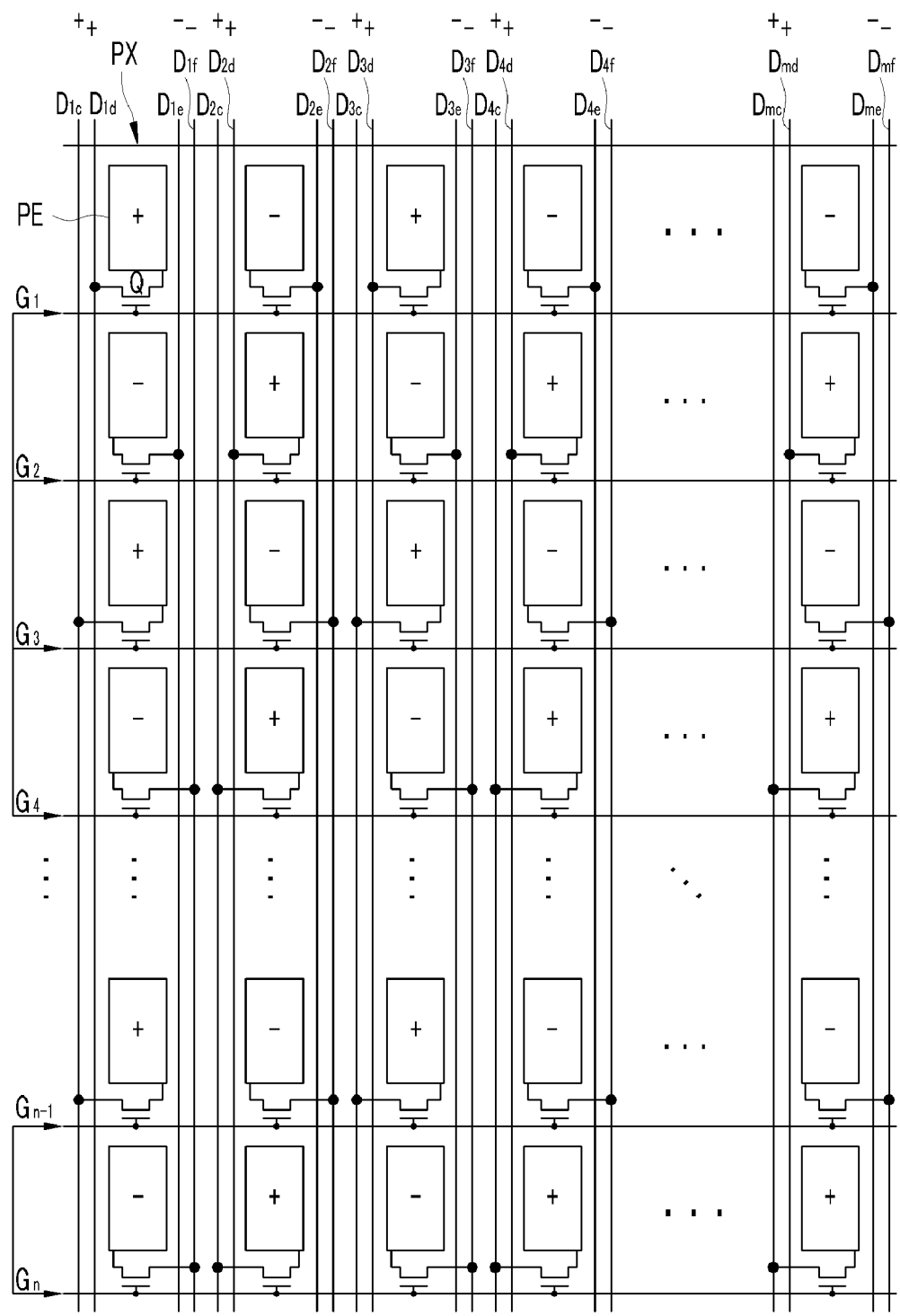
FIG. 8 is a top plan view layout illustrating an exemplary embodiment of a spatial arrangement of pixels and signal lines of an LCD according to the present invention.

FIG. 8 is a top plan view layout illustrating an exemplary embodiment of a spatial arrangement of a liquid crystal panel assembly according to the present invention.

Referring to FIG. 8, another exemplary embodiment of a liquid crystal panel assembly 300 according to the present invention includes a plurality of pixels PX which are arranged in a matrix. Each pixel PX includes a pixel electrode PE and a switching element Q which is connected to the pixel electrode PE. A plurality of gate lines $G_1$-$G_m$ which extend in a substantially horizontal direction are arranged between pixel rows, and a plurality of pairs of data lines $D_{1c}$, $D_{1d}$, $D_{1e}$, $D_{1f}$, $D_{2c}$, $D_{2d}$, $D_{2e}$, $D_{2f}$, $D_{3c}$, $D_{3d}$, $D_{3e}$, $D_{3f}$, $D_{4c}$, $D_{4d}$, $D_{4e}$, $D_{4f}$ ... $D_{mc}$, $D_{md}$, $D_{me}$, and $D_{mf}$ which extend in a substantially vertical direction are arranged at the left side and the right side of the pixels PX. The switching element Q is connected to at least one of the gate lines $G_1$-$G_n$ and at least one of the data lines $D_{1c}$-$D_{mf}$.

In a first row and first column of the pixels PX, one gate line G1 and four data lines $D_{1c}$, $D_{1d}$, $D_{1e}$, and $D_{1f}$ are disposed substantially adjacent to one pixel PX. Hereinafter, four data lines $D_{1c}$, $D_{1d}$, $D_{1e}$, and $D_{1f}$ are referred to as a first data line $D_{1c}$, a second data line $D_{1d}$, a third data line $D_{1e}$, and a fourth data line $D_{1f}$ in order from the left side.

The first and second data lines $D_{1c}$ and $D_{1d}$ are disposed at the left side of the pixel PX, and the first data line $D_{1c}$ is disposed toward the outside, compared with the second data line $D_{1d}$. The third and fourth data lines $D_{1e}$ and $D_{1f}$ are disposed at the right side of the pixel PX, and the fourth data line $D_{1f}$ is disposed toward the outside, compared with the third data line $D_{1d}$.

A switching element Q of a pixel PX which is disposed in a first column and a first row is connected to the second data line $D_{1d}$, a switching element Q of a pixel PX which is disposed in a first column and a second row is connected to the third data line $D_{1e}$, a switching element Q of a pixel PX which is disposed in a first column and a third row is connected to the first data line $D_{1c}$, and a switching element Q of a pixel PX which is disposed in a first column and a fourth row is connected to the fourth data line $D_{1f}$. That is, the switching elements Q of neighboring pixels PX in a column direction are connected to different data lines $D_{1c}$, $D_{1d}$, $D_{1e}$, and $D_{1f}$ which are disposed substantially adjacent the pixel PX.

A switching element Q of a pixel PX which is disposed in a first column and a first row is connected to the second data line $D_{1d}$, a switching element Q of a pixel PX which is disposed in a second column and a first row is connected to the third data line $D_{2e}$, a switching element Q of a pixel PX which is disposed in a third column and a first row is connected to the first data line $D_{3d}$, and a switching element Q of a pixel PX which is disposed in a fourth column and a first row is connected to the fourth data line $D_{4e}$. That is, the switching elements Q of neighboring pixels PX in a row direction are also connected to different data lines $D_{1c-1f}$, $D_{2c-2f}$, $D_{3c-3f}$, $D_{4c-4f}$, ..., and $D_{mc-mf}$ which are disposed near those pixels PX, respectively.

Four neighboring gate lines $G_1$, $G_2$, $G_3$, and $G_4$ are connected to each other to receive the same gate signal.

Data voltages flowing to data lines $D_{1c-1f}$, $D_{2c-2f}$, $D_{3c-3f}$, $D_{4c-4f}$, ..., and $D_{mc-mf}$ which are positioned at the left side and the right side of one pixel PX have opposite polarities. That is, a data voltage flowing to data lines $D_{1c}$, $D_{1d}$, $D_{2c}$, $D_{2d}$, $D_{3c}$, $D_{3d}$, $D_{4c}$, $D_{4d}$, ... $D_{mc}$, and $D_{md}$ which are positioned at the left side of the pixel PX has a positive polarity (+), and a data voltage flowing to data lines $D_{1e}$, $D_{1f}$, $D_{2e}$, $D_{2f}$, $D_{3e}$, $D_{3f}$, $D_{4e}$, $D_{4f}$ ... $D_{me}$, and $D_{mf}$ that are positioned at the right side of the pixel PX has a negative polarity (−). Alternative exemplary embodiments include configurations wherein the polarities are reversed, with the negative polarity data voltages being applied to the left side and the positive polarity data voltages being applied to the right side.

Accordingly, neighboring pixels PX in a row direction have polarity opposite to each other, and neighboring pixels PX in a column direction also have polarity opposite to each other.

Now, referring to FIGS. 9 to 11, an exemplary embodiment of the liquid crystal panel assembly shown in FIG. 8 will be described in detail.

Figure 9:
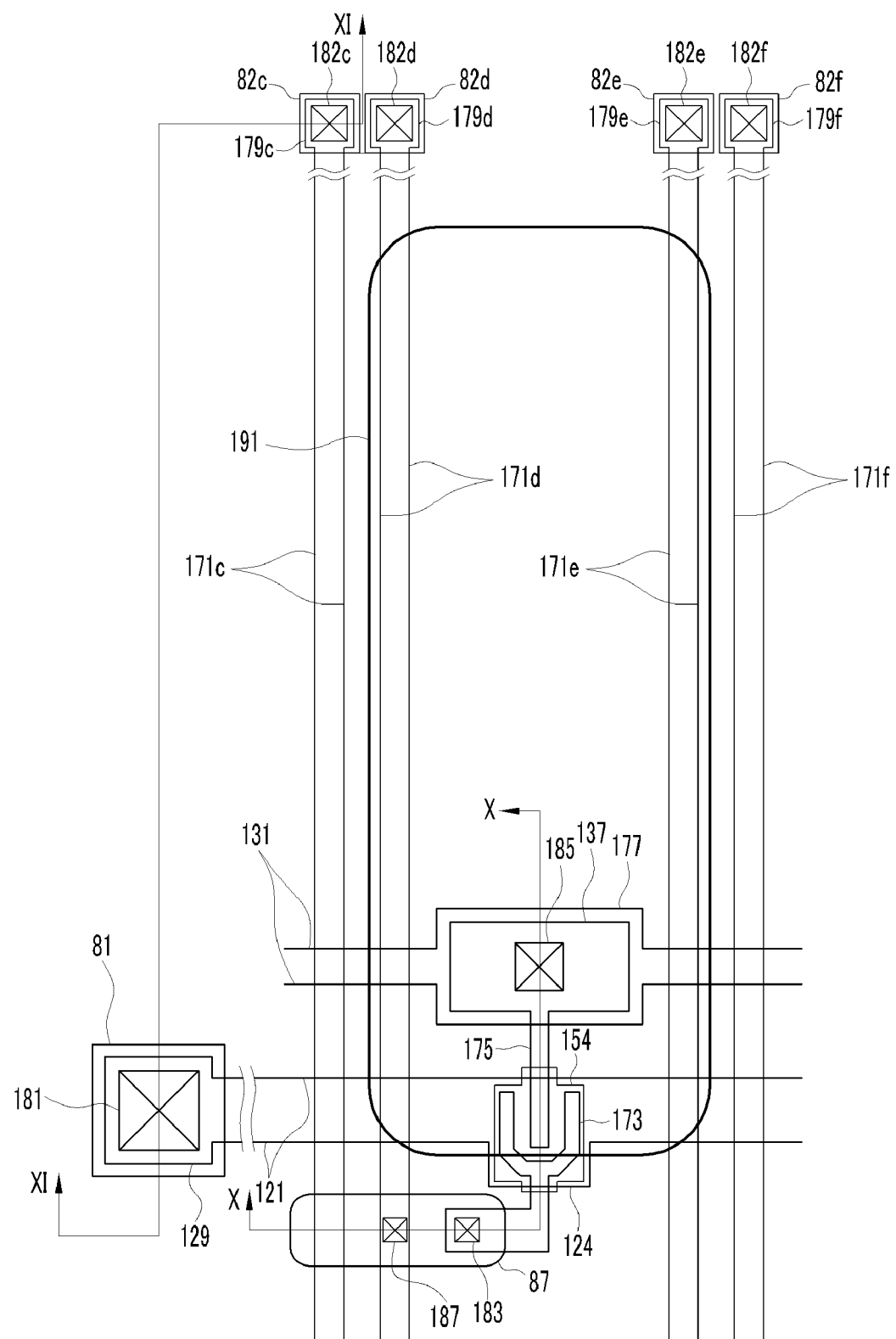
FIG. 9 is a top plan view layout illustrating one pixel and signal line of an exemplary embodiment of a liquid crystal panel assembly according to the present invention.
Figure 10:
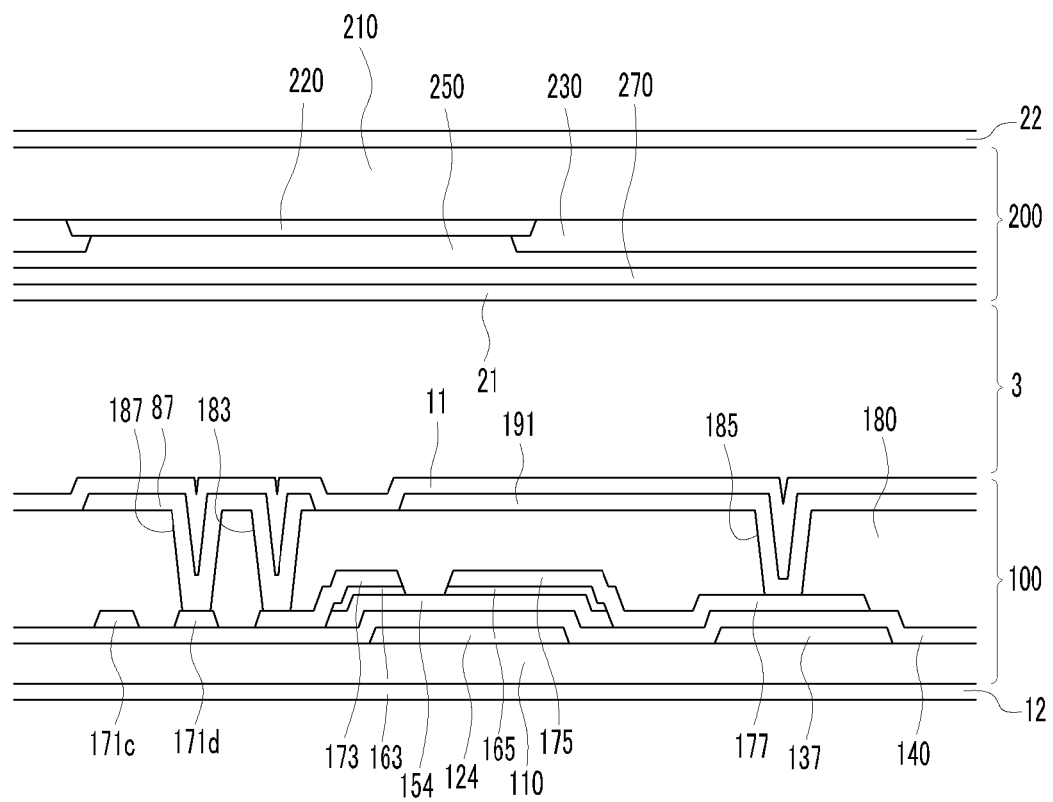
FIGS. 10 and 11 are cross-sectional views of the exemplary embodiment of a liquid crystal panel assembly shown in FIG. 9 taken along lines X-X and XI-XI, respectively.
Figure 11:
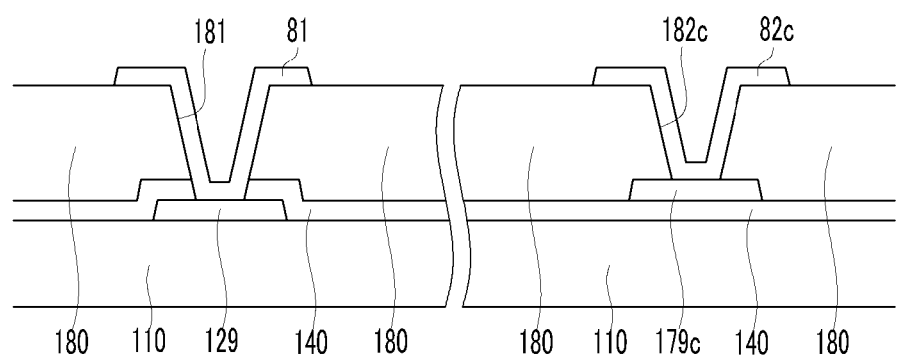

FIG. 9 is a top plan view layout of one pixel and signal lines of an exemplary embodiment of a liquid crystal panel assembly according to the present invention, and FIGS. 10 and 11 are cross-sectional views of the exemplary embodiment of a liquid crystal panel assembly shown in FIG. 9 taken along lines X-X and XI-XI, respectively.

FIGS. 9 to 11 show a form of a pixel and signal lines which are disposed in a first row and a first column.

The lower panel 100 will be described in more detail below.

A plurality of gate lines 121 and a plurality of storage electrode lines 131 are formed on the insulation substrate 110 exemplary embodiments of which are made of transparent glass or plastic.

Each gate line 121 transmits a gate signal and generally extends in a substantially horizontal direction. Each gate line 121 includes a plurality of gate electrodes 124 which protrude substantially vertically from the gate line 121, and a wide end part 129 for connecting to other layers or an external driving circuit (not shown). In the exemplary embodiment wherein a gate driving circuit is integrated with the substrate 110, the gate lines 121 extend to connect to the gate driving circuit.

Each storage electrode line 131 receives a predetermined voltage and extends substantially parallel to the gate line 121. Each storage electrode line 131 is positioned between two adjacent gate lines 121 and is positioned closer to a lower one of the two gate lines 121. The storage electrode lines 131 include a storage electrode 137 which extends substantially vertically therefrom. However, the shape and disposition of the storage electrode lines 131 can be variously modified.

A gate insulating layer 140 is formed on the gate lines 121 and the storage electrode lines 131.

A plurality of semiconductor islands 154 are formed on the gate insulating layer 140. The semiconductors 154 are positioned on the gate electrodes 124.

A plurality of ohmic contact islands 163 and 165 are formed on the semiconductors 154. The ohmic contacts 163 and 165 are formed in pairs and disposed on the semiconductors 154.

First, second, third, and fourth data lines 171c, 171d, 171e, and 171f, a source electrode 173, and a drain electrode 175 are formed on the ohmic contacts 163 and 165 and the gate insulating layer 140.

The data lines 171c-f transmit a data signal and generally extend in a vertical direction to intersect the gate line 121 and the storage electrode line 131. In the present exemplary embodiment each of the data lines 171c-f includes wide end parts 179c, 179d, 179e, and 179f for connecting to other layers or an external driving circuit. In the alternative exemplary embodiment wherein the data driving circuit is integrated with the substrate 110, the data lines 171c-f extend to connect to the data driving circuit 110.

The drain electrode 175 is separated from the data lines 171c-f and faces the source electrode 173 with respect to the gate electrode 124. Each drain electrode 175 includes one wide end part and another bar-type end part. The wide end part overlaps with the storage electrode 137, and a part of the bar-type end part is surrounded by the source electrode 173 which is bent in a U-shape.

One gate electrode 124, one source electrode 173, and one drain electrode 175 along with the semiconductor 154 constitute one TFT, and a channel of the TFT is formed in the semiconductor 154 between the source electrode 173 and the drain electrode 175.

The ohmic contacts 163 and 165 exist only between the lower semiconductor 154 and the upper data lines 171c-f and drain electrode 175 and lower contact resistance therebetween.

A passivation layer 180 is formed on the data lines 171c-f, the drain electrode 175, and the exposed portion of the semiconductor 154.

A plurality of contact holes 182c, 182d, 182e, 182f, 183, 185, and 187 for exposing each of the end parts 179c-f of the data lines 171c-f and the source electrode 173, the drain electrode 175, and a middle part of the second data line 171d are formed on the passivation layer 180, and plurality of contact holes 181 for exposing the end part 129 of the gate line 121 are formed on the passivation layer 180 and the gate insulation layer 140.

A plurality of pixel electrodes 191 and a plurality of contact assistants 81, 82c, 82d, 82e, and 82f, and a connecting member 87 are formed on the passivation layer 180.

The pixel electrode 191 is physically and electrically connected to the drain electrode 175 through a contact hole 185 and receives a data voltage from the drain electrode 175. The pixel electrode 191 to which the data voltage is applied along with the common electrode 270 of another display panel 200 which receives a common voltage generates an electric field and thus determines an orientation of liquid crystal molecules of the liquid crystal layer 3 disposed between two electrodes 191 and 270. According to the determined orientation of liquid crystal molecules, polarization of light passing through the liquid crystal layer 3 changes.

The pixel electrode 191 and the drain electrode 175 which is connected thereto overlap with the storage electrode 137 and the storage electrode line 131. A capacitor which is formed as the pixel electrode 191 and the drain electrode 175 which is electrically connected thereto overlap with the storage electrode line 131 is referred to as a storage capacitor Cst, and the storage capacitor Cst enhances voltage storage ability of the liquid crystal capacitor Clc.

The pixel electrode 191 has a pair of main edges disposed substantially in parallel to each other and has an approximate quadrangle shape.

The pixel electrode 191 overlaps with the second and third data lines 171d and 171e. In such an exemplary embodiment, parasitic capacitance can be generated between the pixel electrode 191 and the second and third data lines 171d and 171e. However, as described above, because a data voltage having different polarities flows to the second and third data lines 171d and 171e, even if parasitic capacitance is generated between the pixel electrode 191 and the second and third data lines 171d and 171e, the parasitic capacitance is offset. Accordingly, vertical crosstalk is prevented from being generated and an aperture ratio of the display panel can be improved.

The contact assistants 81 and 82c-f are connected to the end part 129 of the gate line 121 and the end parts 179c-f of the data lines 171c-f through the contact holes 181 and 182c-f. The contact assistants 81 and 82c-f supplement an adhesive property between the end part 129 of the gate line 121 and the end parts 179c-f of the data lines 171c-f and an external device, and protect them from abrasion or other damage.

The connecting member 87 is connected to the source electrode 173 and the second data line 171d through the contact holes 183 and 187. Accordingly, the source electrode 173 receives a data voltage through the second data line 171d.

Now, the upper panel 200 will be described in more detail. A light blocking member 220 is formed on an insulation substrate 210 exemplary embodiments of which are made of transparent glass or plastic. A plurality of color filters 230 is also formed on the substrate 210. The color filter 230 are disposed substantially within an area which is surrounded with the light blocking member 230, and extends substantially in a vertical direction along a column of the pixel electrodes 110.

An overcoat 250 is formed on the color filter 230 and the light blocking member 220. A common electrode 270 is formed on the overcoat 250. Alignment layers 11 and 21 are coated on an inner surface of the display panels 100 and 200, and may be horizontal alignment layers.

Polarizers 12 and 22 are provided on an outer surface of the display panels 100 and 200, and in one exemplary embodiment the transmissive axes of the two polarizers 12 and 22 are substantially orthogonal to each other and one transmissive axis is substantially parallel to the gate lines 121.

The liquid crystal display may include a backlight unit (not shown) for supplying light to the polarizers 12 and 22, the display panels 100 and 200, and the liquid crystal layer 3.

The liquid crystal layer 3 has a positive dielectric anisotropy, and in a state where an electric field does not exist, liquid crystal molecules of the liquid crystal layer 3 are aligned so that long axes thereof are horizontal to a surface of the two display panels 100 and 200. Accordingly, incident light is blocked without passing through at least one of the orthogonal polarizers 12 and 22.

Figure 12:
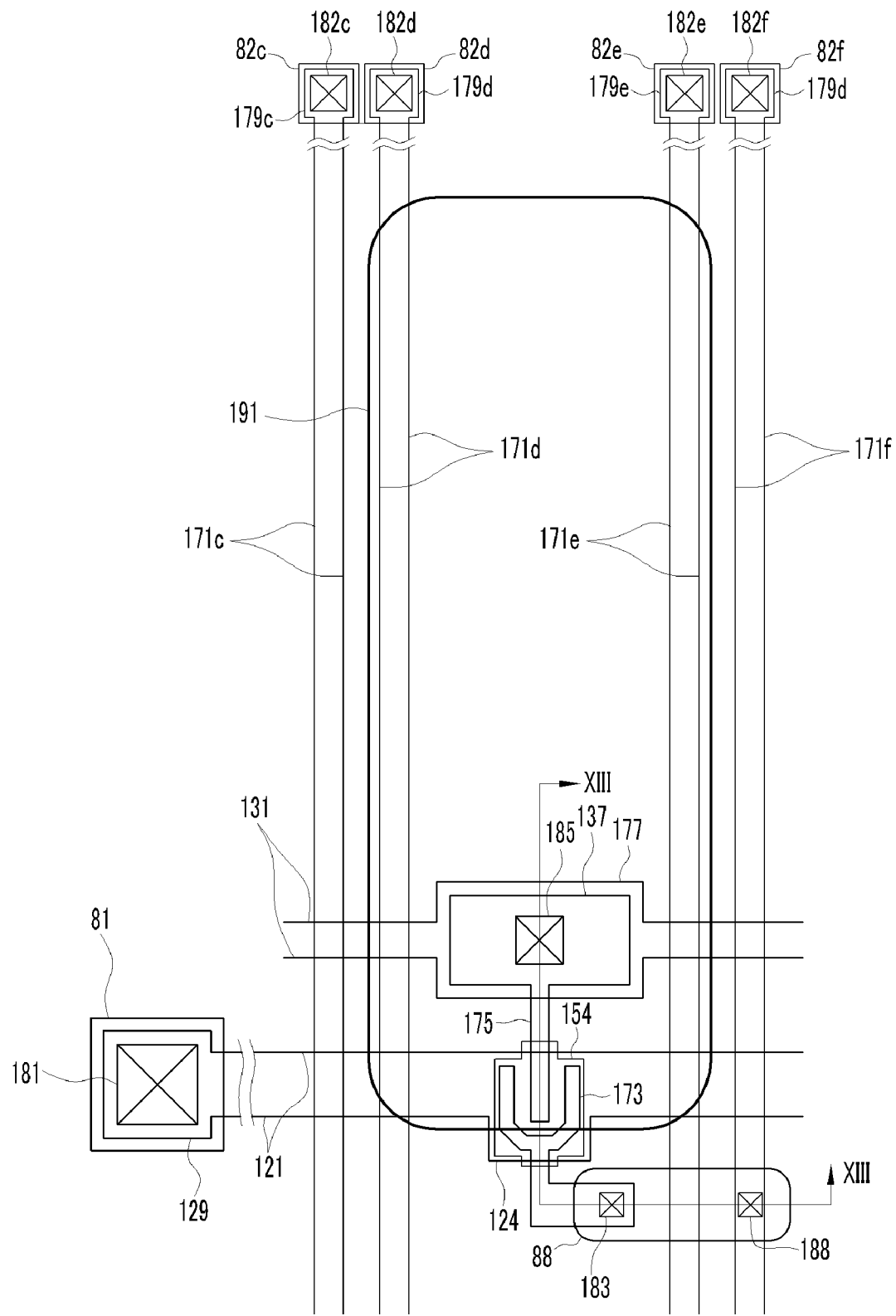
FIG. 12 is a top plan view layout illustrating a different pixel and signal lines of an exemplary embodiment of a liquid crystal panel assembly according to the present invention.
Figure 13:
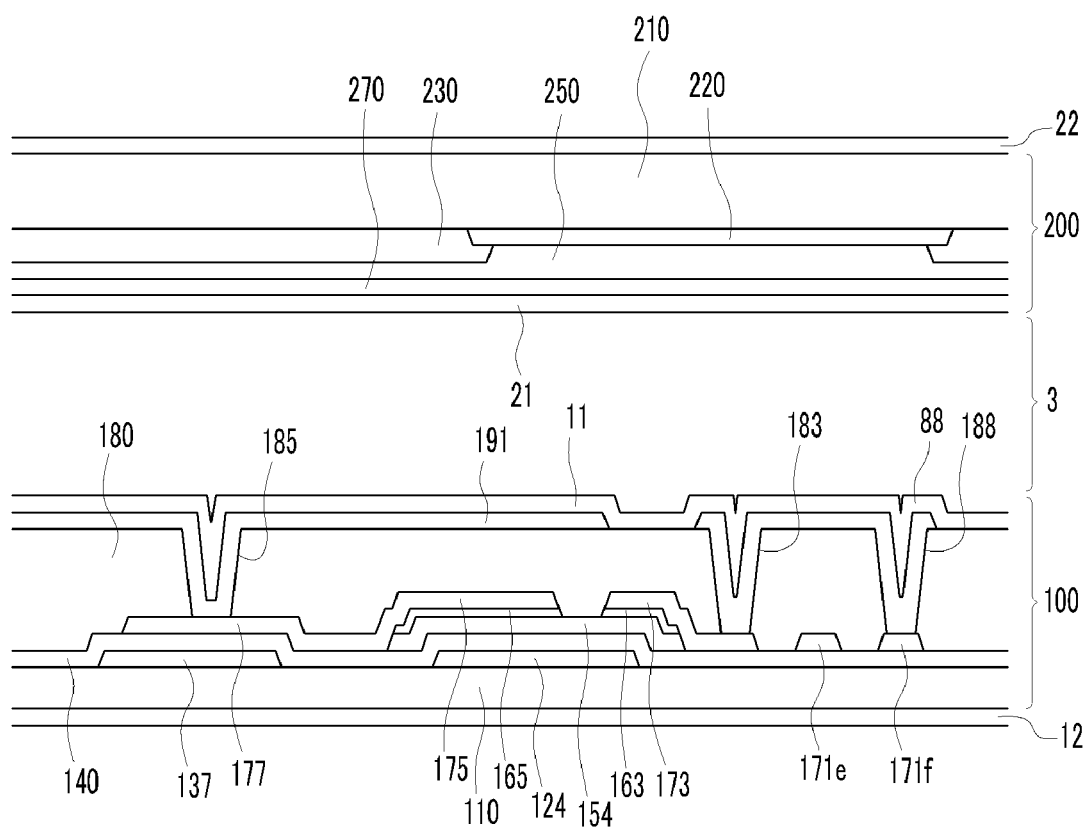
FIG. 13 is a cross-sectional view of the exemplary embodiment of a liquid crystal panel assembly shown in FIG. 12 taken along line XIII-XIII.

Now, referring to FIGS. 12 and 13, a form of a pixel and signal lines which are disposed in a fourth row and a first column is described in detail.

FIG. 12 is a top plan view layout of an exemplary embodiment of a liquid crystal panel assembly according to the present invention, and FIG. 13 is a cross-sectional view of the exemplary embodiment of a liquid crystal panel assembly shown in FIG. 12 taken along line XIII-XIII.

Similar to the pixel which is disposed in a first row and a first column, a pixel which is disposed in a fourth row and a first column includes a lower panel 100 and an upper panel 200 which are disposed opposite to each other, a liquid crystal layer 3 which is interposed between the two display panels, and a pair of polarizers 12 and 22 which are attached to an outer surface of the display panels 100 and 200, respectively.

In the lower panel 100, a plurality of gate conductors including the gate lines 121 are formed on the insulation substrate 110. Each gate line 121 includes a gate electrode 124 and an end part 129. A gate insulating layer 140 is formed on the gate lines 121. A semiconductor island 154 is formed on the gate insulating layer 140, and a plurality of ohmic contacts 163 and 165 are formed on the semiconductor island 154. A data conductor including four data lines 171c-f, the source electrode 173, and a plurality of drain electrodes 175 is formed on the ohmic contacts 163 and 165 and the gate insulating layer 140. The data lines 171c-f include end parts 179c-f. A passivation layer 180 is formed on the data conductors 171c-f and 175 and the exposed portion of the semiconductor 154, and contact holes 181, 182c-f, 183, 185, and 188 are formed on the passivation layer 180 and the gate insulating layer 140. A pixel electrode 191, contact assistants 81 and 82c-f, and a connecting member 88 are formed on the passivation layer 180. An alignment layer 11 is formed on the pixel electrode 191, the contact assistants 81 and 82c-f, and the passivation layer 180.

In the upper panel, a light blocking member 220, a plurality of color filters 230, an overcoat 250, a common electrode 270, and an alignment layer 21 are formed on the insulation substrate 210.

Unlike the exemplary embodiment of a pixel shown in FIG. 9, in an exemplary embodiment of a pixel shown in FIGS. 12 and 13, an end part of the source electrode 173 is bent to the right side, and the connecting member 88 is connected to the source electrode 173 and the fourth data line 171f. That is, the connecting member 88 extends to the fourth data line 171f passing over the third data line 171e which is disposed between the source electrode 173 and the fourth data line 171f. The contact member 88 is then connected to the fourth data line 171f through the contact hole 188.

When FIG. 9 is compared with FIG. 12, the connecting member 87 of FIG. 9 extends to the first data line 171c even though the contact member 87 contacts the second data line 171d through the contact hole 187. Accordingly, plane areas of the connecting members 87 and 88 of FIGS. 9 and 12 are substantially identical. Accordingly, optical characteristics of each pixel can be identical.

Many characteristics of the exemplary embodiment of a liquid crystal panel assembly of FIGS. 9 to 11 can be applied to the liquid crystal panel assembly shown in FIG. 5.

Although not shown in the drawings, a pixel which is disposed in a second row and a first column and a pixel which is disposed in a third row and a first column also have a form similar to those of FIGS. 9 and 12, and only a connection relationship of the source electrode 173 and the data lines 171c-f through various contact holes is modified.

Now, referring to FIGS. 14 and 15, another exemplary embodiment of a liquid crystal panel assembly according to the present invention will be described in detail.

Figure 14:
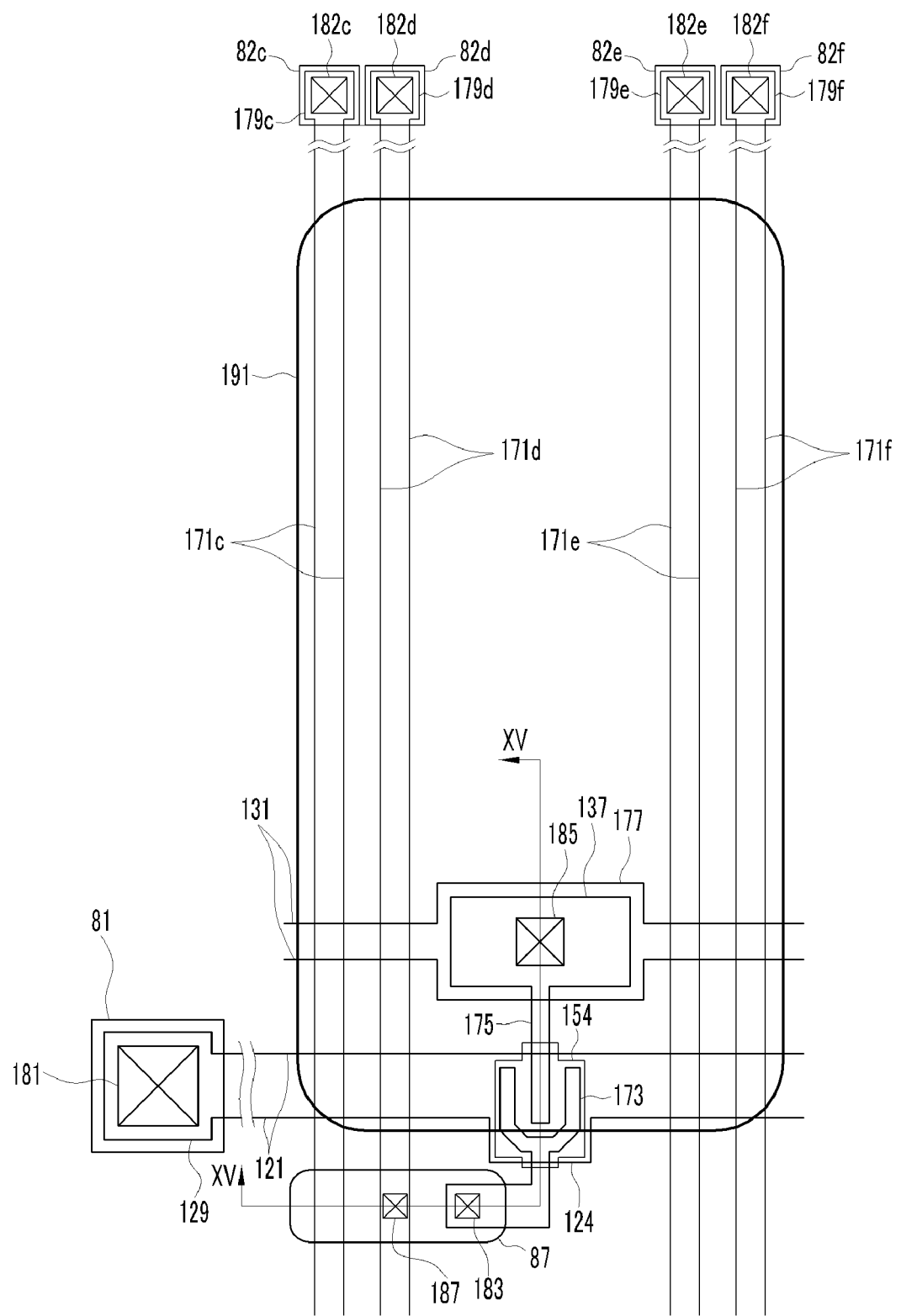
FIG. 14 is a top plan view layout of another exemplary embodiment of a liquid crystal panel assembly according to the present invention.
Figure 15:
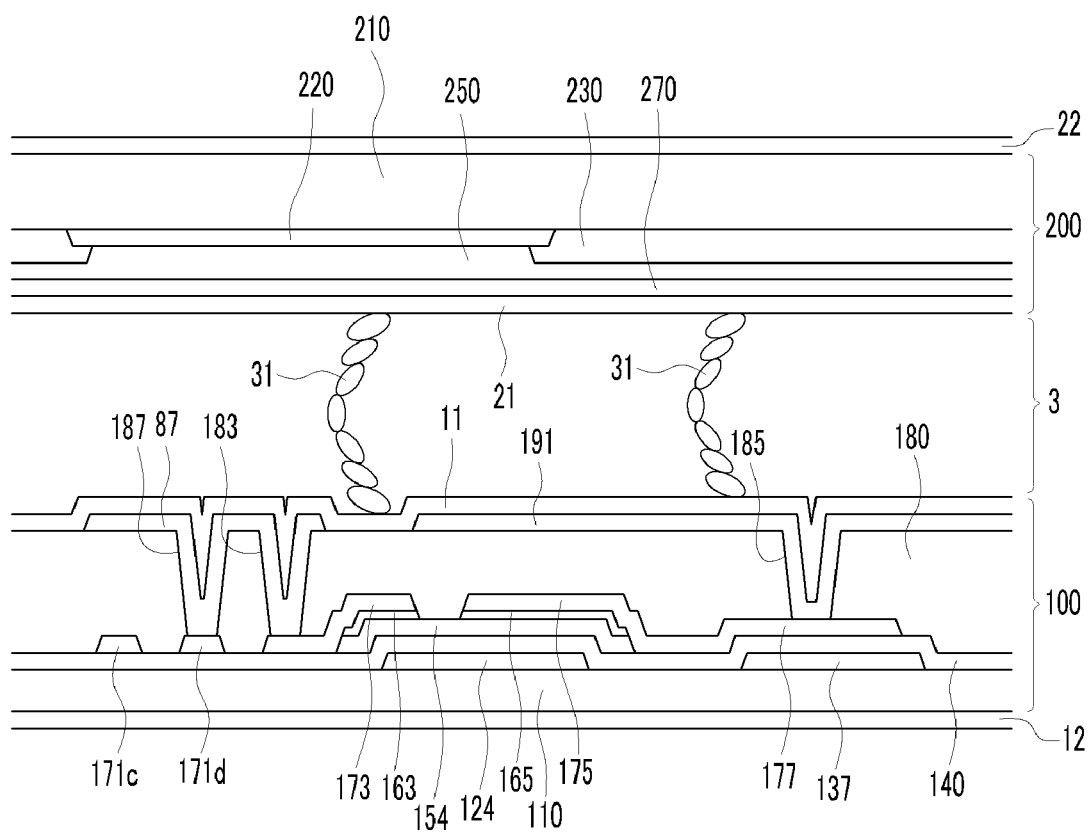
FIG. 15 is a cross-sectional view of the exemplary embodiment of a liquid crystal panel assembly shown in FIG. 14 taken along line XV-XV.

FIG. 14 is a top plan view layout of another exemplary embodiment of a liquid crystal panel assembly according to the present invention, and FIG. 15 is a cross-sectional view of the exemplary embodiment of a liquid crystal panel assembly shown in FIG. 14 taken along line XV-XV.

An exemplary embodiment of a liquid crystal panel assembly according to the present invention includes the lower panel 100 and the upper panel 200 which are disposed opposite to each other and the liquid crystal layer 3 which is interposed between the two display panels.

In the lower panel, a plurality of gate conductors, including the gate lines 121, are formed on the insulation substrate 110. Each gate line 121 includes a gate electrode 124 and an end part 129. The gate insulating layer 140 is formed on the gate conductor 121. A semiconductor island 154 is formed on the gate insulating layer 140, and a plurality of ohmic contacts 163 and 165 are formed on the semiconductor island 154. A data conductor including four data lines 171c-f, the source electrode 173, and a plurality of drain electrodes 175 is formed on the ohmic contacts 163 and 165 and the gate insulating layer 140. In one exemplary embodiment the data lines 171c-f include the end parts 179c-f. A passivation layer 180 is formed on the data conductors 171c-f and 175 and the exposed portion of the semiconductor 154, and the contact holes 181, 182c-f, 183, 185, and 188 are formed on the passivation layer 180 and the gate insulating layer 140. A pixel electrode 191, contact assistants 81 and 82c-f, and a connecting member 87 are formed on the passivation layer 180. An alignment layer 11 is formed on the pixel electrode 191, the contact assistants 81 and 82c-f, and the passivation layer 180.

In the upper panel, a light blocking member 220, a plurality of color filters 230, an overcoat 250, a common electrode 270, and an alignment layer 21 are formed on the insulation substrate 210.

Unlike the exemplary embodiment of a liquid crystal panel assembly shown in FIG. 9, in the current exemplary embodiment of a liquid crystal panel assembly according to the present invention, all data lines 171c-f overlap with the pixel electrode 191. Because data voltages flowing to data lines disposed on opposite sides of the pixel PX have opposite polarities, parasitic capacitance generated between the data lines 171c-f and the pixel electrode 191 is offset. Accordingly, vertical crosstalk is prevented from being generated and an aperture ratio can be increased.

The liquid crystal layer 3 of an LCD according to the present exemplary embodiment includes nematic liquid crystal having positive dielectric anisotropy, and has a splay alignment in an initial stage and is converted into a bend alignment by a bend voltage as shown in FIG. 15, and in this state, the liquid crystal layer 3 may modify light passing therethrough for display purposes. An LCD having the liquid crystal layer 3 consisting of the liquid crystal molecules 31 is called an optically compensated bend ("OCB") mode, and the liquid crystal display which is driven in the OCB mode defaults to a transparent state, e.g. in a state where a voltage is not applied.

Now, referring to FIGS. 16 and 17, an exemplary embodiment of the OCB mode LCD will be described in detail.

Figure 16:
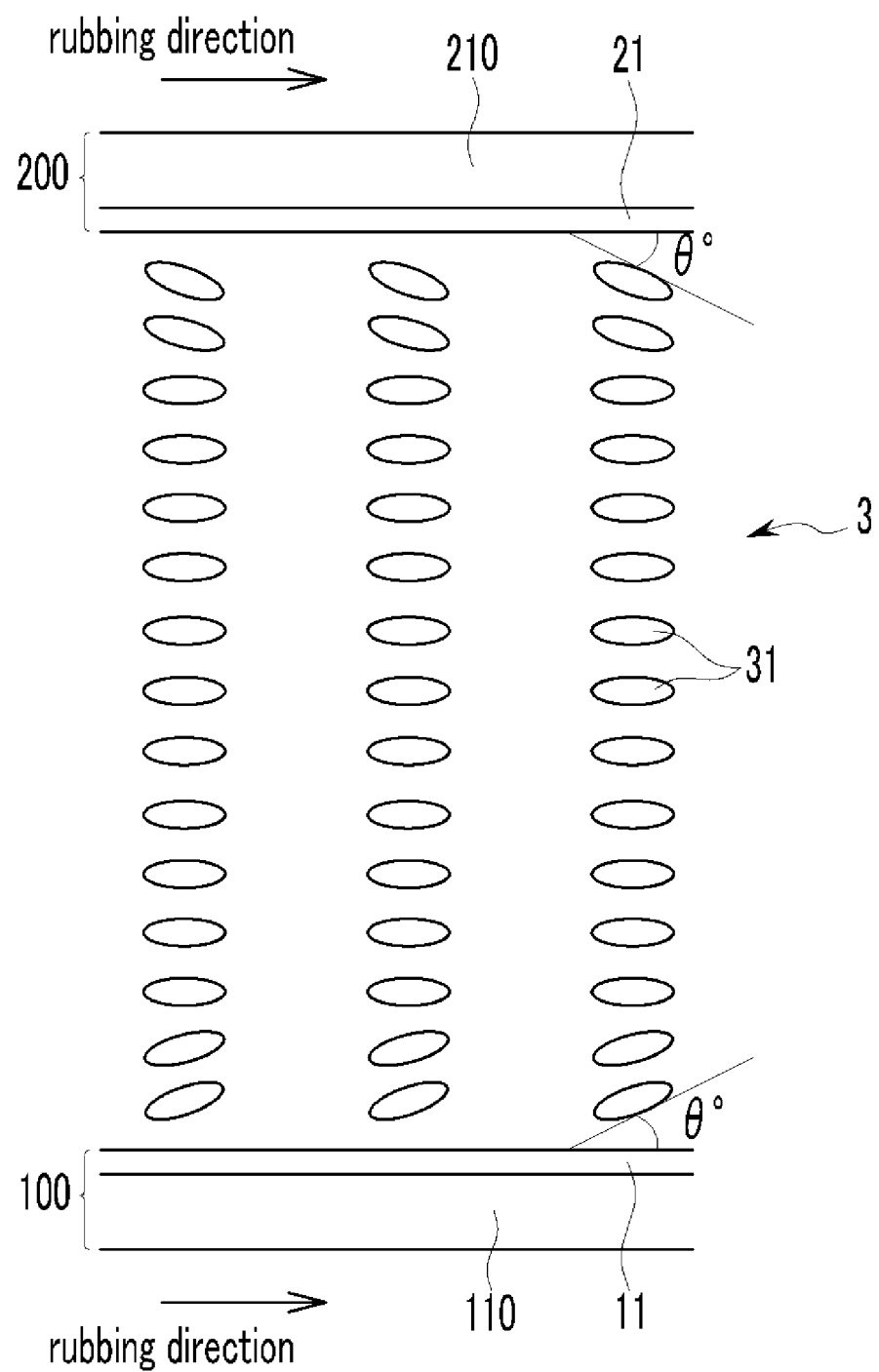
FIG. 16 is a schematic diagram illustrating an exemplary embodiment of an alignment state of liquid crystal before a voltage is applied to an LCD according to the present invention.
Figure 17:
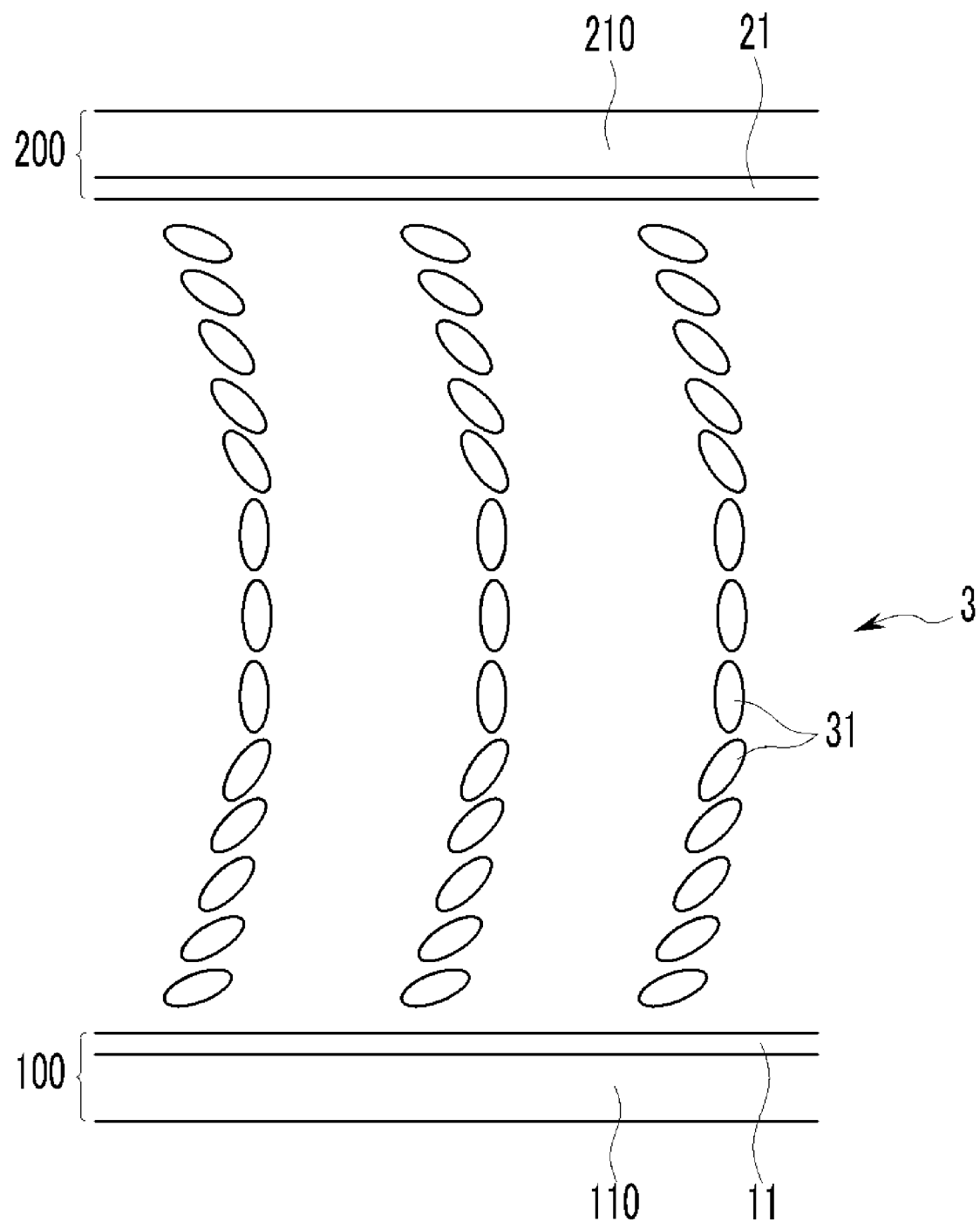
FIG. 17 is a schematic diagram illustrating an exemplary embodiment of an alignment state of liquid crystal after a predetermined voltage is applied to an LCD according to the present invention.

FIG. 16 is a schematic diagram illustrating an exemplary embodiment of an alignment state of liquid crystal before a predetermined voltage is applied to an LCD according to the present invention, and FIG. 17 is a schematic diagram illustrating an exemplary embodiment of an alignment state of liquid crystal after a bend voltage is applied to an LCD according to a further exemplary embodiment of the present invention.

Referring to FIG. 16, in a state where a voltage is not applied, the liquid crystal molecules 31 around two alignment layers 11 and 21 are aligned in a horizontal direction with a line inclination angle ($\theta$) where one end of the liquid crystal molecule 31 in inclined with respect to a rubbing direction. Accordingly, the liquid crystal molecules 31 are arranged in parallel to surfaces of the substrates 110 and 210 and are symmetrical about a surface (hereinafter referred to as a "central surface") which is disposed at approximately the same distance from a surface of the two alignment layers 11 and 21. The alignment is called a splay alignment.

When a predetermined voltage, e.g., a bend voltage, is applied, an electric field is formed in the liquid crystal layer 3, and alignment of the liquid crystal molecules 31 changes from a splay alignment to another alignment.

In more detail, when a voltage starts to be applied to an electrode (not shown) of the two display panels 100 and 200 an electric field which is substantially vertical with respect to a surface of the two display panels 100 and 200 is generated in the liquid crystal layer 3, the liquid crystal molecules 31 around the alignment layers 11 and 21 react to the electric field by bending. However, because a bending direction of the liquid crystal molecules 31 on surfaces of the two alignment layers 11 and 21 are identical, the rising direction of the liquid crystal molecules 31 collides in a middle portion of the liquid crystal layer 3 and thus a large stress occurs, so that alignment of the liquid crystal molecules 31 changes to a twist alignment having stable energy. This alignment is called a transient splay alignment.

When an electric field becomes stronger, the liquid crystal has a bend alignment, as shown in FIG. 17. Such an alignment transition is substantially uniformly generated in an entire liquid crystal capacitor Clc of the liquid crystal panel assembly 300.

Many characteristics of the liquid crystal panel assembly shown in FIGS. 9 to 11 can be applied to the liquid crystal panel assembly shown in FIGS. 14 to 17.

Now, referring to FIGS. 18 and 19, another exemplary embodiment of the liquid crystal panel assembly according to the present invention will be described in detail.

Figure 18:
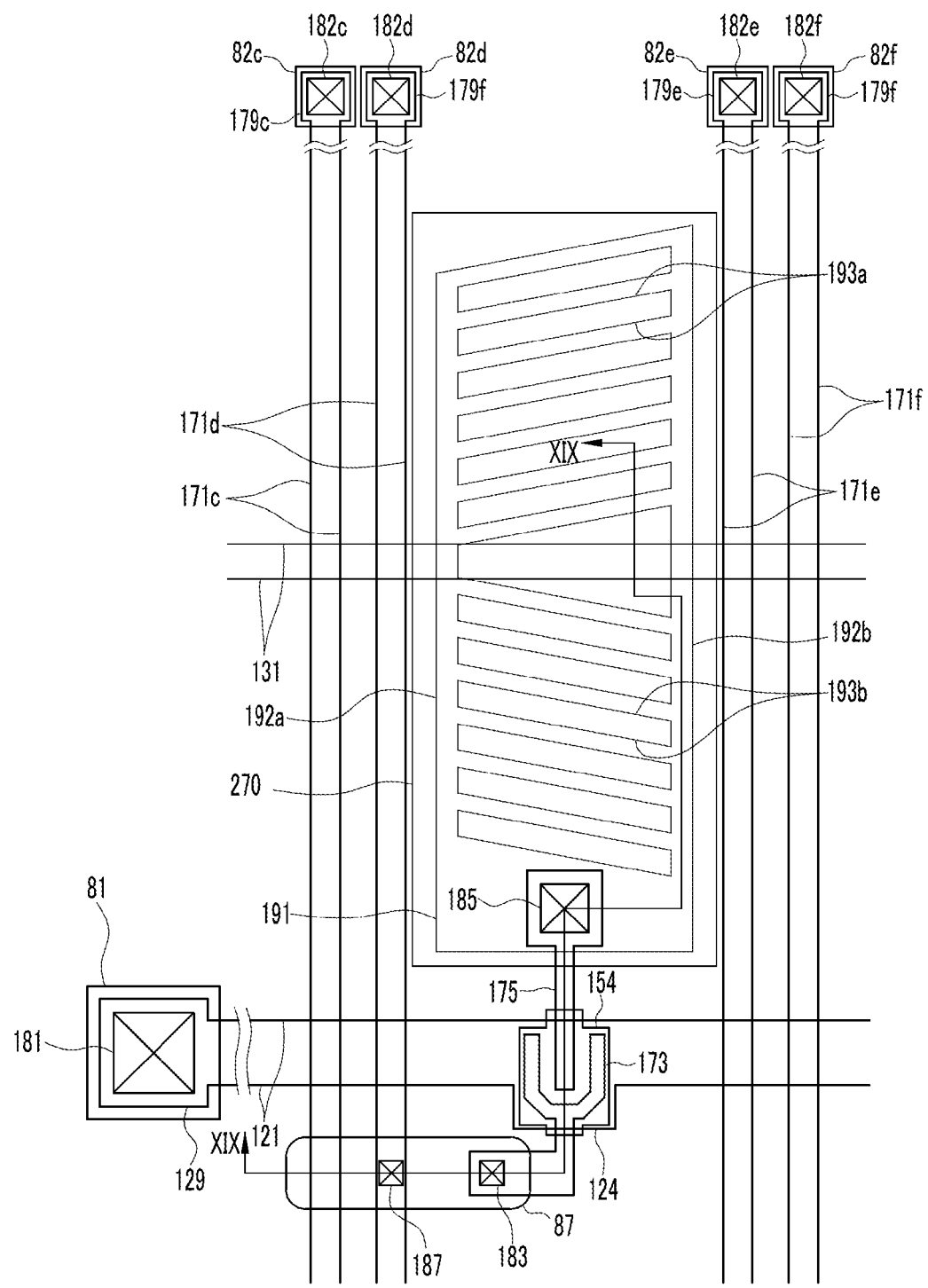
FIG. 18 is a top plan view layout of another exemplary embodiment of a liquid crystal panel assembly according to the present invention.
Figure 19:
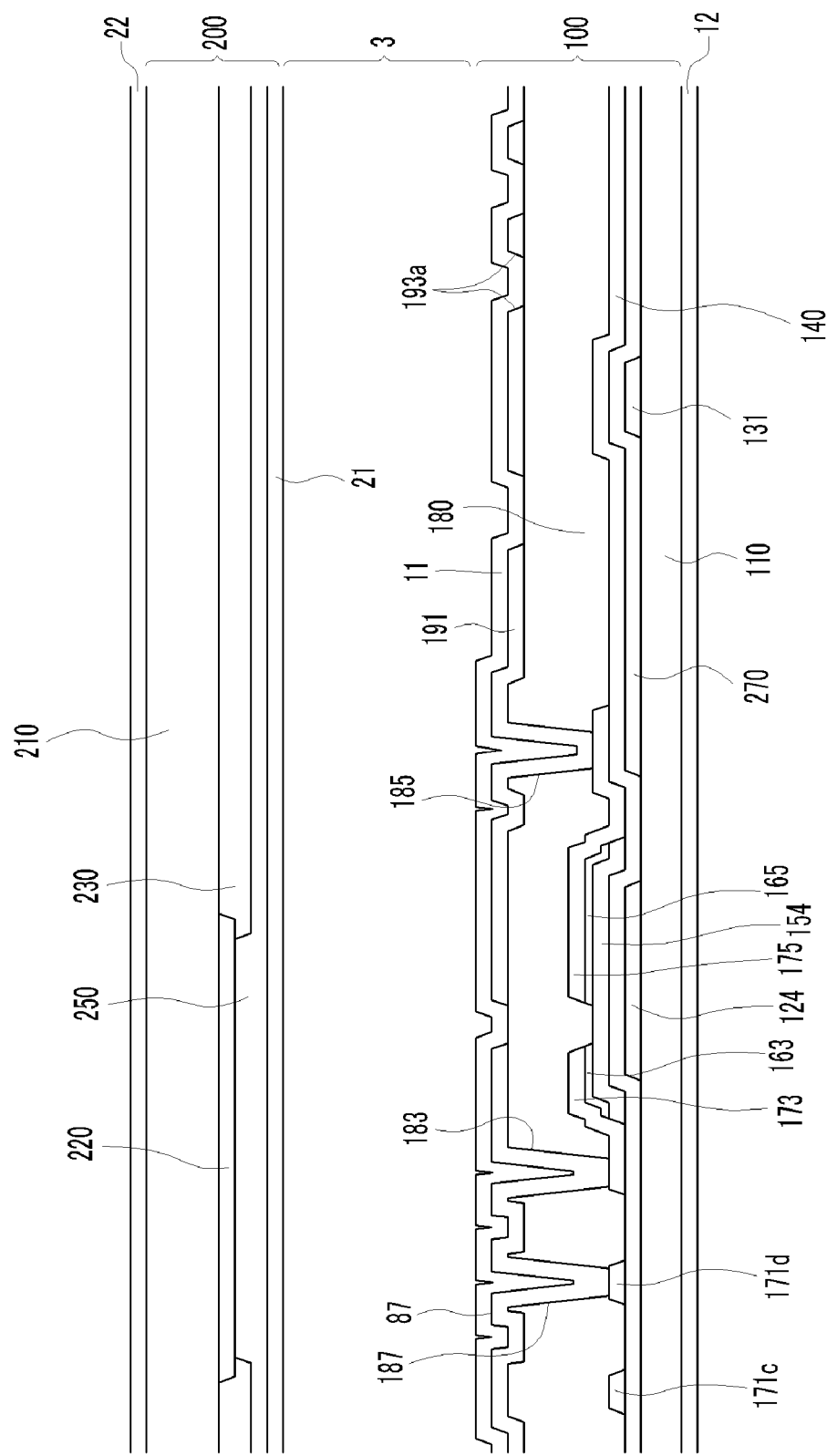
FIG. 19 is a cross-sectional view of the liquid crystal panel assembly shown in FIG. 18 taken along line XIX-XIX.

FIG. 18 is a top plan view layout of another exemplary embodiment of a liquid crystal panel assembly according to the present invention, and FIG. 19 is a cross-sectional view of the liquid crystal panel assembly shown in FIG. 18 taken along line XIX-XIX.

The present exemplary embodiment of a liquid crystal panel assembly includes a lower panel 100 and an upper panel 200 which are disposed opposite to each other, a liquid crystal layer 3 which is interposed between the two display panels 100 and 200, and a pair of polarizers 12 and 22 which are attached to outer surfaces of the display panels 100 and 200, respectively.

The present exemplary embodiment of a liquid crystal panel assembly has substantially the same layered structures that of the exemplary embodiment of a liquid crystal panel assembly shown in FIGS. 9 and 11.

On the lower panel 100, a common electrode 270 is formed on an insulation substrate 110. Further, a plurality of gate conductors including gate lines 121 and storage electrode lines 131 are formed on the insulation substrate 110. Each gate line 121 includes the gate electrode 124 and the end part 129. A gate insulating layer 140 is formed on the gate conductor 121. A semiconductor island 154 is formed on the gate insulating layer 140, and a plurality of ohmic contacts 163 and 165 are formed on the semiconductor island 154. Data conductors including four data lines 171c-f, a source electrode 173, and a drain electrode 175 are formed on the ohmic contacts 163 and 165 and the gate insulating layer 140. In the present exemplary embodiment the data lines 171c-f include end parts 179c-f. A passivation layer 180 is formed on the data conductors 171c-f and 175 and an exposed portion of the semiconductor 154, and contact holes 181, 182c-f, 183, 185, and 187 are formed on the passivation layer 180 and the gate insulating layer 140. A pixel electrode 191, contact assistants 81 and 82c-f, and a connecting member 87 are formed on the passivation layer 180. An alignment layer 11 is formed on the pixel electrode 191, the contact assistants 81 and 82c-f, and the passivation layer 180.

In the upper panel, a light blocking member 220, a plurality of color filters 230, an overcoat 250, a common electrode 270, and an alignment layer 21 are formed on the insulation substrate 210.

Unlike the previously described exemplary embodiments of a liquid crystal panel assembly, in the current exemplary embodiment of a liquid crystal panel assembly, the common electrode 270 is included in the lower panel 100, not in the upper panel 200. That is, the common electrode 270 is formed on the insulation substrate 110 of the lower panel 110. The common electrode 270 is made of a transparent conductive material, exemplary embodiments of which include ITO, and it contacts the storage electrode line 131 and receives a common voltage Vcom through the storage electrode line 131.

Furthermore, the passivation layer 180 of the liquid crystal panel assembly according to the present exemplary embodiment is made of an inorganic layer, and has a thickness smaller than the passivation layer 180 of the previously described exemplary embodiment of a liquid crystal panel assembly.

The pixel electrode 191 according to the present exemplary embodiment has a form different from the pixel electrodes 191 of the previously described exemplary embodiments. The pixel electrode 191 according to the present exemplary embodiment includes two vertical parts 192a and 192b which are substantially parallel to the data lines 171c-f, and a plurality of cutouts 193a and 193b which are formed between the two vertical parts 192a and 192b. The cutouts 193a and 193b are divided into a first set of cutouts 193a which are disposed at the upper side of a storage electrode line 131 and a second set of cutouts 193b which are disposed at the lower side of the storage electrode line 131. The first set of cutouts 193a forms an acute angle with the storage electrode line 131, and the second set of cutouts 193b forms an obtuse angle with the storage electrode line 131. The first and second cutouts 193a and 193b are formed substantially symmetrically with respect to the storage electrode line 131.

An electric field which is generated by the pixel electrode 191 and the common electrode 270 includes a vertical component which is orthogonal to a surface of a display panel, and a horizontal component which is parallel to a surface of a display panel and which is orthogonal to edges of the cutouts 193a and 193b.

The horizontal component of the electric field rotates the liquid crystal molecules of the liquid crystal layer 3 which is positioned on the field generating electrodes 270 and 191 parallel to a surface of the lower panel 100. However, a vertical component of an electric field enables the liquid crystal molecules to be vertically inclined. Polarization of light passing through a liquid crystal layer changes according to the orientation of the liquid crystal molecules which in turn in determined by the electric field. Furthermore, light transmittance also changes according to the polarization thereof.

Because long axes of the liquid crystal molecules are dispersed in several directions, a liquid crystal display including the TFT array panel has a wide reference viewing angle. Furthermore, because both a horizontal component and a vertical component of an electric field contribute to display of an image, the aperture ratio and transmittance of the liquid crystal display are very high, and particularly in a transmissive liquid crystal display in which both the common electrode 270 and the pixel electrode 191 are transparent, the aperture ratio and transmittance of the liquid crystal display are extremely high.

Further, because only the passivation layer 180 having a thin thickness of about 2000 □ is interposed between common electrode 270 and the pixel electrode 191, an electric field having identical intensity throughout the region covered by the pixel electrode 191 even when a low voltage is applied can be formed in a liquid crystal layer, compared with an exemplary embodiment wherein both the gate insulating layer 140 and the passivation layer 180 are interposed between the common electrode 270 and the pixel electrode 191, and thus a cost of a driving integrated circuit can be reduced.

The pixel electrode 191 and the common electrode 270 form a liquid crystal capacitor Clc including a liquid crystal layer as a dielectric material. The pixel electrode 191 and the common electrode 270 form a storage capacitor Cst including the passivation layer 180 as a dielectric material. Both the liquid crystal capacitor Clc and the storage capacitor Cst sustain an applied voltage within the pixel even after a TFT is turned off.

Many characteristics of the exemplary embodiment of a liquid crystal panel assembly shown in FIGS. 9 to 11 can be also applied to the exemplary embodiment of a liquid crystal panel assembly shown in FIGS. 18 and 19.

Now, referring to FIGS. 20 to 22, another exemplary embodiment of a liquid crystal panel assembly according to the present invention will be described in detail.

Figure 20:
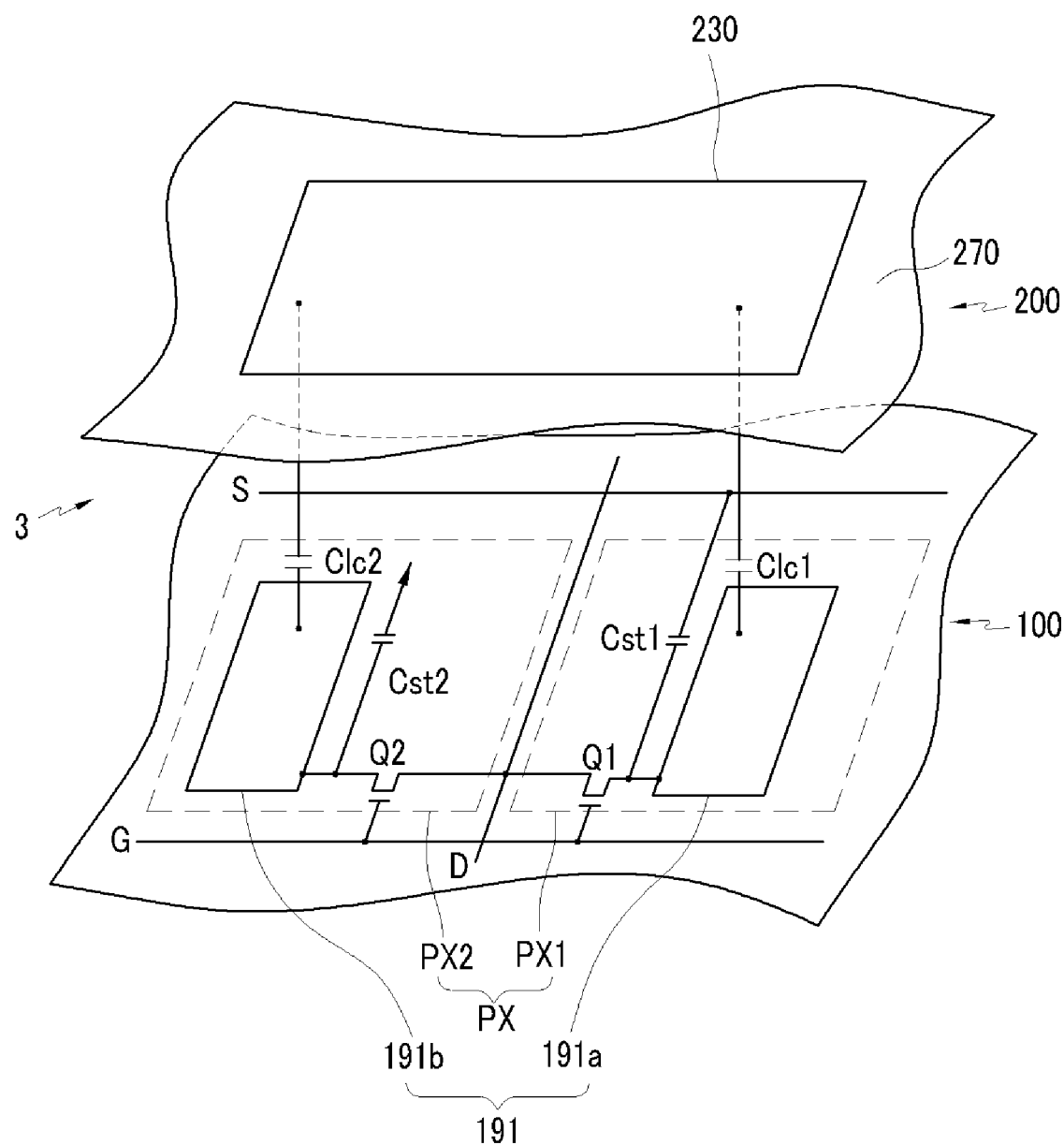
FIG. 20 is an equivalent circuit diagram of another exemplary embodiment of a pixel of an LCD according to the present invention.

FIG. 20 is an equivalent circuit diagram of another exemplary embodiment of a pixel of a liquid crystal display according to the present invention.

Referring to FIG. 20, the present exemplary embodiment of a liquid crystal panel assembly 300 includes signal lines G, D, and S, and a plurality of pixels PX which are connected thereto and which are arranged in approximately a matrix form. The liquid crystal panel assembly 300 includes the lower and upper panels 100 and 200 which are disposed opposite to each other and the liquid crystal layer 3 which is interposed therebetween.

The signal lines include a plurality of gate lines G for transmitting a gate signal (hereinafter referred to as a "scanning signal") and a plurality of data lines D for transmitting a data signal. The gate lines G extend in substantially a row direction and are substantially parallel to each other, and the data lines D extend in substantially a column direction and are substantially parallel to each other.

The signal lines also include a first storage electrode line S for transmitting a first storage electrode signal and a second storage electrode line (not shown) for transmitting a second storage electrode signal. The first storage electrode signal and the second storage electrode signal have opposite phases to each other.

Each pixel PX includes first and second subpixels PX1 and PX2, and the subpixels PX1 and PX2 include switching elements Q1 and Q2, liquid crystal capacitors Clc1 and Clc2, and storage capacitors Cst1 and Cst2, respectively.

The first and second switching elements Q1 and Q2 have a control terminal which is connected to the gate line G, an input terminal which is connected to the data line D, and an output electrode which is connected to the liquid crystal capacitors Clc1 and Clc2 and the storage capacitors Cst1 and Cst2, respectively.

The liquid crystal capacitors Clc1/Clc2 have a subpixel electrode 191a/191b of the lower panel 100 and a common electrode 270 of the upper panel 200 as two terminals thereof, and the liquid crystal layer 3 between the subpixel electrode 191a/191b and the common electrode 270 functions as a dielectric material. Each of the subpixel electrodes of the pair of subpixel electrodes 191a/191b are separated from each other and form one pixel electrode 191. The common electrode 270 is formed on substantially an entire surface of the upper panel 200 and receives a common voltage Vcom. Alternative exemplary embodiments include configurations wherein the common electrode 270 is divided into a plurality of electrodes on the surface of the upper panel 200. The liquid crystal layer 3 has negative dielectric anisotropy, and the liquid crystal molecules of the liquid crystal layer 3 can be aligned so that long axes thereof are vertical to a surface of the two display panels when an electric field is not applied.

The storage capacitor Cst1 of the first subpixel PX1 is connected to the switching element Q1 and the first storage electrode line S, and the storage capacitor Cst2 of the second subpixel PX2 is connected to the switching element Q2 and a separate signal line (not shown).

Now, referring to FIGS. 21 and 22, the exemplary embodiment of a liquid crystal panel assembly shown in FIG. 20 will be described in detail.

Figure 21:
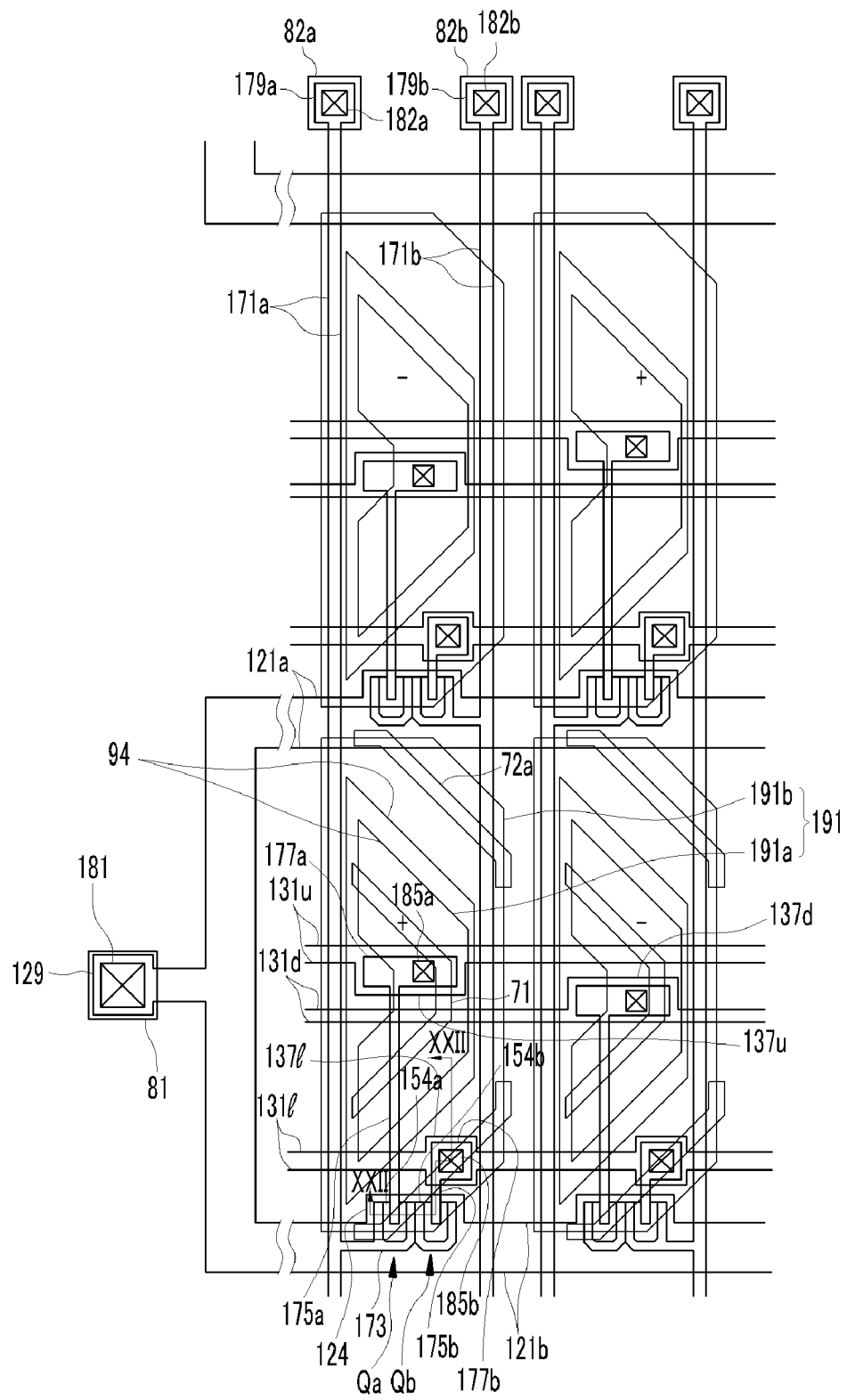
FIG. 21 is a top plan layout of another exemplary embodiment of a liquid crystal panel assembly according to the present invention.
Figure 22:
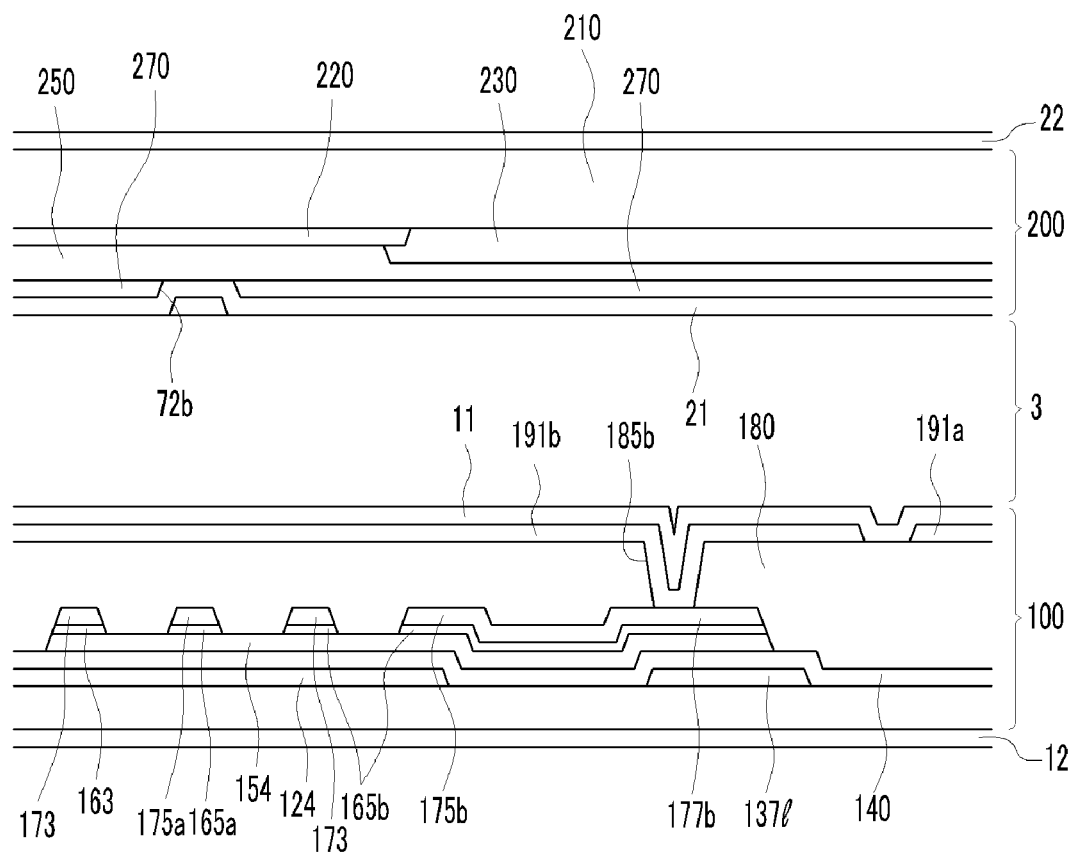
FIG. 22 is a cross-sectional view of the exemplary embodiment of a liquid crystal panel assembly shown in FIG. 21 taken along line XXII-XXII.

FIG. 21 is a top plan view layout of another exemplary embodiment of a liquid crystal panel assembly according to the present invention, and FIG. 22 is a cross-sectional view of the exemplary embodiment of a liquid crystal panel assembly shown in FIG. 21 taken along line XXI-XXII.

As shown in FIGS. 21 and 22, the present exemplary embodiment of a liquid crystal panel assembly includes a lower panel 100 and an upper panel 200 which are disposed opposite to each other, a liquid crystal layer 3 which is interposed between the two display panels 100 and 200, and a pair of polarizers 12 and 22 which are attached to outer surfaces of the display panels 100 and 200, respectively.

A layered structure of the present exemplary embodiment of a liquid crystal panel assembly is generally the same as that of the exemplary embodiment of a liquid crystal panel assembly shown in FIGS. 9 to 11. In the lower panel 100, a plurality of gate conductors including a plurality of gate lines 121a and 121b and a plurality of pairs of first, second, and third storage electrode lines 131u, 131d, and 131l are formed on the insulation substrate 100. Each of the gate lines 121a and 121b includes a plurality of gate electrodes 124. In the present exemplary embodiment each one end of two neighboring gate lines 121a and 121b are connected to each other to form an end part 129. The first, second, and third storage electrode lines 131u, 131d, and 131l include a plurality of the first, second, and third storage electrodes 137u, 137d, and 137l, respectively. A gate insulating layer 140 is formed on the gate conductors 121a, 121b, 131u, 131d, and 131l.

A plurality of semiconductor stripes (not shown) including a projection 154 is formed on the gate insulating layer 140, and a plurality of ohmic contact islands 165a and 165b and a plurality of ohmic contact stripes (not shown) having the projection 163 are formed on the semiconductor stripes.

Data conductors including a plurality of pairs of left and right data lines 171a and 171b and a plurality of first and second drain electrodes 175a and 175b are formed on the ohmic contacts 163 and 165. In the present exemplary embodiment each of the left and right data lines 171a and 171b includes a plurality of source electrodes 173 and end parts 179a and 179b, and the first drain electrode 175a includes an extension 177a, and the second drain electrode 175b includes an extension 177b.

The gate electrode 124, the source electrode 173, and the first drain electrode 175a along with the semiconductor 154 form a first TFT Qa, and a channel of the TFT Qa is formed in the semiconductor 154 between the source electrode 173 and the first drain electrode 175a. Further, the gate electrode 124, the source electrode 173, and the second drain electrode 175b along with the semiconductor 154 form a second TFT Qb, and a channel of the TFT Qb is formed in the semiconductor 154 between the source electrode 173 and the second drain electrode 175b.

A passivation layer 180 is formed on the data conductors 171a, 171b, 175a, and 175b and the exposed portion of the semiconductor 154a and 154, and a plurality of contact holes 181, 182a, 182b, 185a, and 185b are formed on the passivation layer 180 and the gate insulating layer 140.

A plurality of pixel electrodes 191 including the first and second subpixel electrodes 191a and 191b and a plurality of contact assistants 81, 82a, and 82b are formed on the passivation layer 180.

Each pixel electrode 191 has four main edges which are substantially parallel to the gate lines 121a and 121b or the data line 171, and has approximately a quadrangle shape having a chamfered left corner. The chamfered oblique edge of the pixel electrode 191 forms an angle of about 45° with respect to the gate line 121.

A pair of first and second subpixel electrodes 191a and 191b forming one pixel electrode 191 are engaged with each other with a gap 94 which is inserted therebetween, and the first subpixel electrode 191a is inserted into the center of the second subpixel electrode 191b. In the present exemplary embodiment the second subpixel electrode 191b has a larger area than the first subpixel electrode 191a.

The first subpixel electrode 191a is physically and electrically connected to the first drain electrode 175a through a contact hole 185a and receives a data voltage from the first drain electrode 175a. The second subpixel electrode 191b is physically and electrically connected to the second drain electrode 191b through a contact hole 185b and receives a data voltage from the first drain electrode 175b.

The subpixel electrodes 191a and 191b to which the data voltage is applied along with the common electrode 270 generates an electric field and thus determines an orientation of liquid crystal molecules of the liquid crystal layer 3 between the two pixel electrodes 191a/191b and the common electrode 270.

Furthermore, as described above, each of the subpixel electrodes 191a and 191b and the common electrode 270 form the liquid crystal capacitors Clc1 and Clc2 and thus each of the subpixel electrodes 191a and 191b and the common electrode 270 sustain an applied voltage even after the TFTs Qa and Qb are turned off. In order to enhance the voltage sustaining ability of the pixel, the storage capacitors Cst1 and Cst2 which are connected in parallel to the liquid crystal capacitors Clca and Clcb are formed with an overlap of the first and second subpixel electrodes 191a and 191b, extensions 177a and 177b of the drain electrodes 175a and 175b which are connected thereto, and the storage electrodes 137u, 137d, and 137l. In more detail, the extension 177a of the first drain electrode 175a overlaps with the first storage electrode line 131u and the first storage electrode 137u, and an extension 177b of the second drain electrode 175b overlaps with the third storage electrode line 131l and the third storage electrode 137l. The first drain electrode 175a of another neighboring pixel overlaps with the second storage electrode line 131d and the second storage electrode 137d.

The alignment layer 11 is formed on the pixel electrode 191, the contact assistants 81a, 81b, and 82, and the passivation layer 180.

The semiconductor 154 extends along the data lines 171a and 171b and the drain electrodes 175a and 175b to form a semiconductor stripe (not shown), and the ohmic contact 163 extends along the data lines 171a and 171b to form an ohmic contact stripe (not shown). The semiconductor stripe has a planar shape which when viewed from above is substantially the same as the data conductors 171a, 171b, 175a, and 175b and the lower ohmic contacts 163 and 165.

In an exemplary embodiment of a method of manufacturing the exemplary embodiment of a TFT array panel according to the present invention, the data lines 171a and 171b, the drain electrodes 175a and 175b, the semiconductor 154, and the ohmic contacts 163 and 165 are formed with one photolithography process.

A photosensitive film using in the photolithography process has a thickness which differs according to position, and particularly the photosensitive film includes a first part and a second part in a decreasing order of thickness. The first part is positioned in a wiring region which includes the data lines 171a and 171b and the drain electrode 175a and 175b, and the second part is positioned in a channel region of the TFT.

Various methods of forming a photosensitive film of varying thickness according to position exist, and various methods of forming a light transmitting area, a light blocking area, and a translucent area in a photo mask also exist. A thin film having a slit pattern or a lattice pattern having varying degrees of transmittance, or a thin film having a middle thickness is provided in the translucent area. In one exemplary embodiment wherein the slit pattern is used, a width of a slit or an interval between slits is smaller than a resolution of a light exposer used in a photolithography process. In another exemplary embodiment a method of using a photosensitive film which can reflow exists. That is, a thin part is formed by enabling a reflowable photosensitive film to flow to a region in which the photosensitive film does not remain after forming the reflowable photosensitive film using a general exposure mask having the light transmitting region and the light blocking region.

By using the above-described methods, one photolithography process can be eliminated, so that a manufacturing method becomes simple. In the upper panel 200, a light blocking member 220, a plurality of color filters 230, an overcoat 250, a common electrode 270 having cutouts 71, 72a, and 72b, and an alignment layer 21 are formed on the insulation substrate 210.

The cutouts include a central cutout 71, an upper cutout 72a, and a lower cutout 72b formed in the common electrode 270, and the pixel electrode 191 is divided into a plurality of partitions by the cutouts 71, 72a, and 72b. The cutouts 71, 72a, and 72b are substantially reverse-symmetrical to the storage electrode lines 131u and 131d.

The lower and upper cutouts 72a and 72b obliquely extend from a right edge to at least one of a left edge, an upward edge, or a downward edge of the pixel electrode 191. The lower and upper cutouts 72a and 72b are positioned in an upper potion of the pixel PX with respect to the storage electrode line 131u and a lower portion of the pixel PX with respect to the storage electrode line 131d, respectively. The lower and upper cutouts 72a and 72b form an angle of about 45° with respect to the gate lines 121a and 121b and extend to be substantially orthogonal to each other.

The central cutout 71 includes a central vertical part and a pair of oblique line parts. The central vertical part extends to be vertical to the storage electrode lines 131u and 131d, and each of a pair of oblique line parts extends from an end of the central vertical part to a left edge of the pixel electrode 191.

When a common voltage is applied to the common electrode 270 and a data voltage is applied to the pixel electrode 191, an electric field which is substantially vertical to a surface of the display panels 100 and 200 is generated. Liquid crystal molecules change orientation so that long axes thereof are vertical to a direction of an electric field in response to the electric field. Hereinafter, both the pixel electrode 191 and the common electrode 271 are referred to as field generating electrodes.

The gap 94 of a pixel electrode of the field generating electrodes 191 and 270 and cutouts 71-72b of a common electrode and an oblique edge of the pixel electrode 191 parallel thereto form a horizontal component in the applied electric field. This horizontal component determines a horizontal inclination direction of liquid crystal molecules by distorting an electric field. A horizontal component of the electric field is vertical to an oblique edge of the gap 94 and cutouts 71-72b and an oblique edge of the pixel electrode 191.

A set of cutouts 71-72b of one common electrode and the gap 94 of the pixel electrode divide the pixel electrode 191 into a plurality of sub-areas, and each sub-area has two main edges for forming an oblique angle to a major edge of the pixel electrode 191. Because most of liquid crystal molecules on each sub-area are inclined in a direction which is substantially vertical with respect to the main edge, inclination directions thereof are arranged in approximately four directions. When inclination directions of the liquid crystal molecules increase, a reference viewing angle of the liquid crystal display also increases.

Alternative exemplary embodiments include configurations wherein at least one cutout 94 and 71-72b may be replaced with a protrusion or a depression, and the shape and disposition of the cutouts 94 and 71-72b may be modified.

Many characteristics of the exemplary embodiment of a liquid crystal panel assembly shown in FIGS. 9 to 11 can be applied to the exemplary embodiment of a liquid crystal panel assembly shown in FIGS. 21 and 22.

Now, referring to FIGS. 23 and 24, another exemplary embodiment of a liquid crystal panel assembly according to the present invention will be described in detail.

Figure 23:
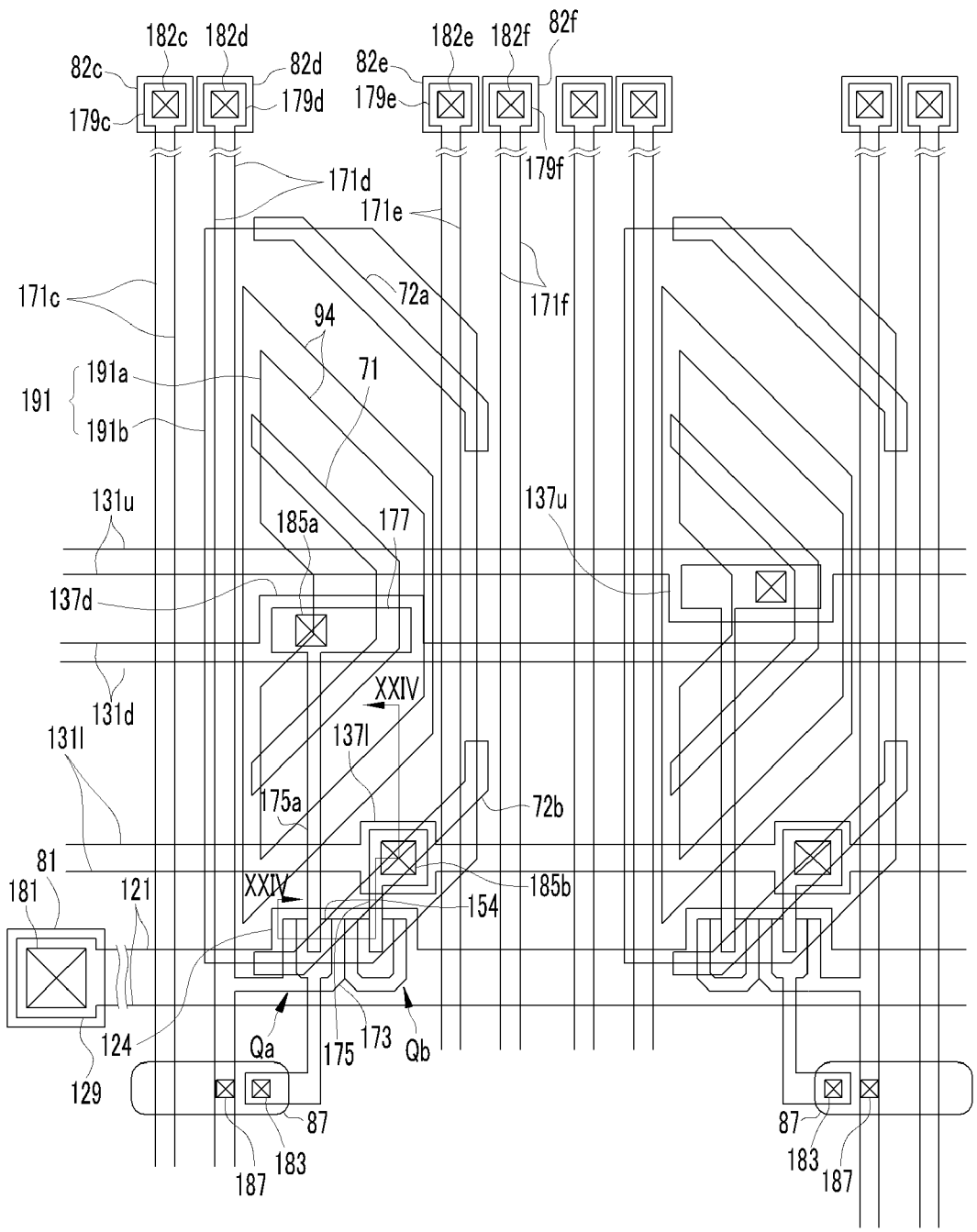
FIG. 23 is a top plan view layout of another exemplary embodiment of a liquid crystal panel assembly according to the present invention.
Figure 24:
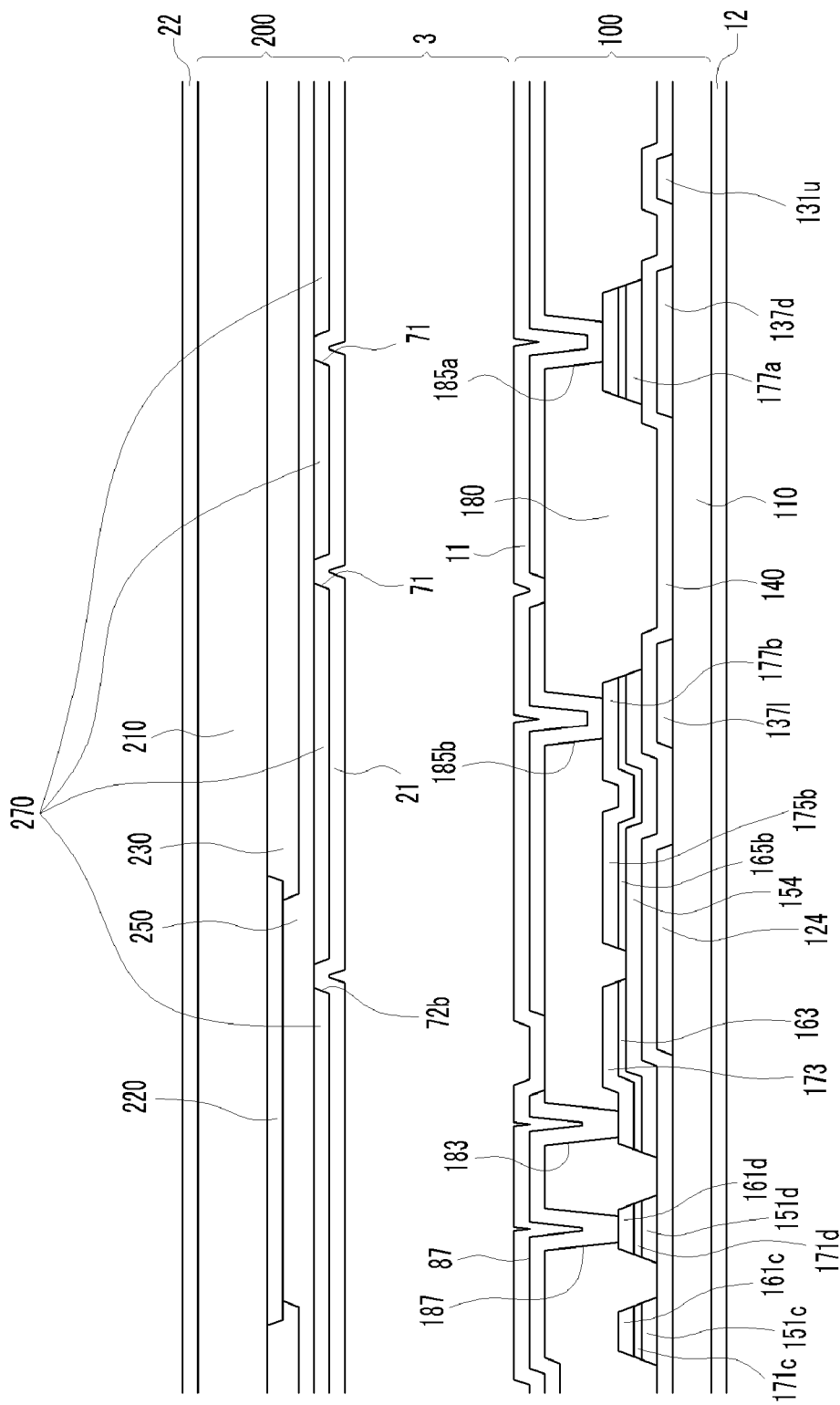
FIG. 24 is a cross-sectional view of the exemplary embodiment of a liquid crystal panel assembly shown in FIG. 23 taken along line XXIV-XXIV.

FIG. 23 is a top plan view layout of another exemplary embodiment of a liquid crystal panel assembly according to the present invention, and FIG. 24 is a cross-sectional view of the exemplary embodiment of a liquid crystal panel assembly shown in FIG. 23 taken along line XXIV-XXIV.

As shown in FIGS. 23 and 24, the present exemplary embodiment of a liquid crystal panel assembly includes a lower panel 100 and an upper panel 200 which are disposed opposite to each other, a liquid crystal layer 3 which is interposed between the two display panels, and a pair of polarizers 12 and 22 which are attached to outer surfaces of the display panels 100 and 200, respectively.

In the lower panel 100, a plurality of gate conductors including gate lines 121 and the first, second, and third storage electrode lines 131u, 131d, and 131l are formed on the insulation substrate 100. In the present exemplary embodiment the gate lines 121 include a plurality of gate electrodes 124 and a wide end part 129. The first, second, and third storage electrode lines 131u, 131d, and 131l include a plurality of the first, second, and third storage electrodes 137u, 137d, and 137l, respectively. A gate insulating layer 140 is formed on the gate conductors 121, 131u, 131d, and 131l.

A plurality of semiconductor stripes 151c and 151d including a projection 154 are formed on the gate insulating layer 140, and a plurality of ohmic contact stripes 161c and 161d having projections 163 and a plurality of ohmic contact islands 165b are formed on the semiconductor stripes.

Data conductors including first, second, third, and fourth data lines 171c, 171d, 171e, and 171f, a source electrode 173, and a first and second drain electrodes 175a and 175b are formed on the ohmic contact 165. In the present exemplary embodiment the first to fourth data lines 171c-f include end parts 179c, 179d, 179e, 179f, respectively. The first drain electrode 175a includes an extension 177.

The gate electrode 124, the source electrode 173, and the first drain electrode 175a along with the semiconductor 154 form a first TFT Q, and a channel of the TFT Qa is formed in the semiconductor 154 between the source electrode 173 and the first drain electrode 175a. Furthermore, the gate electrode 124, the source electrode 173, and the second drain electrode 175b along with the semiconductor 154 form a second TFT Qb, and a channel of the TFT Qb is formed in the semiconductor 154 between the source electrode 173 and the second drain electrode 175b.

A passivation layer 180 is formed on the data conductors 171c-f, 173, 175a, and 175b and the exposed portion of the semiconductor 154, and a plurality of contact holes 181, 182c, 182d, 182e, 182f, 183, 185a, 185b, and 187 are formed in the passivation layer 180 and the gate insulating layer 140.

A pixel electrode 191 including the first and second subpixel electrodes 191a and 191b, contact assistants 81, 82c, 82d, 82e, and 82f, and the connecting member 87 are formed on the passivation layer 180. The connecting member 87 connects the source electrode 173 and the second data line 171d through the contact holes 183 and 187.

Each pixel electrode 191 has four main edges which are substantially parallel to the gate line 121 or the data lines 171c-f and has approximately a quadrangle shape having a chamfered right corner. A chamfered oblique edge of the pixel electrode 191 forms an angle of about 45° with respect to the gate line 121.

A pair of the first and second subpixel electrodes 191a and 191b constituting one pixel electrode 191 are engaged with each other with a gap 94 which is interposed therebetween, and the first subpixel electrode 191a is inserted into the center of the second subpixel electrode 191b. In the present exemplary embodiment the second subpixel electrode 191b has a larger area than the first subpixel electrode 191a.

The first subpixel electrode 191a is physically and electrically connected to the first drain electrode 175a through a contact hole 185a to receive a data voltage from the first drain electrode 175a. The second subpixel electrode 191b is physically and electrically connected to the second drain electrode 175b through a contact hole 185b to receive a data voltage from the second drain electrode 175b.

As the subpixel electrodes 191a and 191b to which a data voltage is applied generate an electric field along with the common electrode 270, orientation of liquid crystal molecules of the liquid crystal layer 3 between the two pixel electrodes 191a/191b and the common electrode 270 is determined.

Furthermore, as described above, as each of the subpixel electrodes 191a and 191b and the common electrode 270 constitute liquid crystal capacitors Clc1 and Clc2, the TFTs Qa and Qb sustain an applied voltage even after the TFTs Qa and Qb are turned off. In order to enhance voltage sustaining ability, the storage capacitors Cst1 and Cst2, which are connected in parallel to the liquid crystal capacitors Clca and Clcb, are formed overlapping the first and second subpixel electrodes 191a and 191b, extensions 177a and 177b of the drain electrodes 175a and 175b which are connected thereto, and the storage electrodes 137u, 137d, and 137l. In more detail, the extension 177a of the first drain electrode 175a overlaps with the first storage electrode line 131u and the first storage electrode 137u, and the extension 177b of the second drain electrode 175b overlaps with the third storage electrode line 131l and the third storage electrode 137l. The first drain electrode 175a of a neighboring pixel overlaps with the second storage electrode line 131d and the second storage electrode 137d.

The alignment layer 11 is formed on the pixel electrode 191, the contact assistants 81a and 81c-f, and the passivation layer 180. The semiconductor 154 extends along the data lines 171c-f and the drain electrodes 175a and 175bs to form a semiconductor stripe (not shown), and the ohmic contact 163 extends along the data lines 171c-f to form an ohmic contact stripe (not shown). The semiconductor stripe has a planar shape which when viewed from above is substantially the same as the data conductors 171c-f, 175a, and 175b and the lower ohmic contacts 163 and 165.

In the upper panel 200, a light blocking member 220, a plurality of color filters 230, an overcoat 250, a common electrode 270 having cutouts 71, 72a, and 72b, and an alignment layer 21 are formed on the insulation substrate 210.

A central cutout 71, an upper cutout 72a, and a lower cutout 72b are formed in the common electrode 270, and a pixel electrode 191 is divided into a plurality of partitions by the cutouts 71, 72a, and 72b. The cutouts 71, 72a, and 72b are substantially reverse-symmetrical with respect to the storage electrode lines 131u and 131d.

The lower and upper cutouts 72a and 72b obliquely extend from a right edge to one of a left edge, an upper edge, or a lower edge of the pixel electrode 191. The lower and upper cutouts 72a and 72b are positioned in a lower half part and an upper half part, respectively, of the storage electrode lines 131*u* and 131*d*. The lower and upper cutouts 72*a* and 72*b* are formed with an angle of about 45° with respect to the gate lines 121*a* and 121*b* and are extended in a substantially vertical direction.

The central cutout 71 includes a central vertical part and a pair of oblique line parts. The central vertical part vertically extends to the storage electrode line 131*u* and 131*d*, and each of the pair of oblique line parts extends toward the left edge of the pixel electrode 191 from an end of the central vertical part.

When a common voltage is applied to the common electrode 270 and a data voltage is applied to the pixel electrode 191, an electric field which is substantially vertical is generated on a surface of the display panels 100 and 200. Liquid crystal molecules change their orientation so that long axes thereof are substantially vertical with respect to a direction of the electric field in response to the electric field. Hereinafter, both the pixel electrode 191 and the common electrode 271 are referred to as field generating electrodes.

An oblique edge of the cutouts 71-72*b* of the common electrode and the gap 94 of a pixel electrode distorts the electric field and thus generates a horizontal component which determines an inclination direction of liquid crystal molecules. A horizontal component of the electric field is substantially vertical to an oblique edge of the cutouts 94 and 71-72*b* and the oblique edge of the pixel electrode 191.

A set of cutouts 71-72*b* of one common electrode and the gap 94 of the pixel electrode divide the pixel electrode 191 into a plurality of sub-areas, and each sub-area has two major edges forming an oblique angle to a main edge of the pixel electrode 191. Since most of liquid crystal molecules on each sub-area are inclined in a direction which is substantially vertical with respect to the main edge, inclination directions thereof are arranged in about four directions. As the inclination directions of the liquid crystal molecules is increased, a number of reference viewing angles of the liquid crystal display increases.

In alternative exemplary embodiments at least one of the gap 94 and the cutouts 71-72*b* can be replaced with a protrusion or a depression, and the shape and disposition of the cutouts 94 and 71-72*b* can be modified.

The liquid crystal layer 3 of the present exemplary embodiment of a liquid crystal display has negative dielectric anisotropy, and in a state were an electric field does not exist, the liquid crystal molecules of the liquid crystal layer 3 are aligned so that long axes thereof are vertical with respect to a surface of the two display panels.

Many characteristics of the liquid crystal panel assembly shown in FIGS. 9 to 11 can be applied to the liquid crystal panel assembly shown in FIGS. 23 and 24.

Now, referring to FIGS. 25A and 25B, an operation of the exemplary embodiment of a liquid crystal display shown FIGS. 20 to 24 will be described in detail.

Figure 25A:
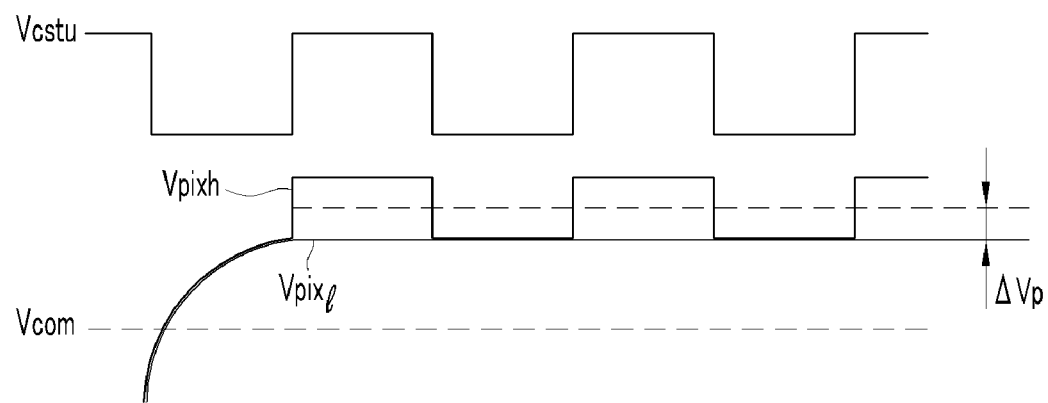
FIGS. 25A and 25B are waveform diagrams illustrating a pixel electrode voltage of the exemplary embodiment of liquid crystal panel assembly shown in FIGS. 20 to 24 along with a storage electrode voltage.

FIG. 25A is a waveform diagram illustrating a storage electrode signal and a pixel electrode voltage when a pixel electrode voltage changes from negative polarity (−) to positive polarity (+) in the exemplary embodiment of an LCD shown in FIGS. 20 to 24. FIG. 25B is a waveform diagram illustrating a storage electrode signal and a pixel electrode voltage when a pixel electrode voltage changes from positive polarity (+) to negative polarity (−) in the exemplary embodiment of an LCD shown in FIGS. 20 to 24.

The first and second storage electrode signals Vcstu and Vcstd have opposite phases and are applied to the first storage electrode line 131*u* and the second storage electrode line 131*d*, respectively, and after the switching elements Q1 and Q2 are turned off, each of the voltage levels of the first and second storage electrode signals Vcstu and Vcstd are reversed. A constant voltage, e.g. a common voltage Vcom, is applied to the third storage electrode line 131*l*.

Referring to FIG. 25A, after the switching element Q is turned off, a subpixel electrode 191*b* of the second subpixel PX2 which receives the third storage electrode signal is charged, and after an initial voltage change from a negative polarity (−) to a positive polarity (+), the voltage of the subpixel electrode 191*b*, which is designated as Vpixl, remains substantially constant. After a voltage Vpixh of a subpixel electrode 191*a* of the first subpixel PX1 which receives the first storage electrode signal Vcstu changes from negative (−) to positive (+) the subpixel electrode 191*b* is charged and the first storage electrode signal Vcstu rises,. Thereafter, a voltage Vpixh of the subpixel electrode 191 *a* of the first subpixel PX1 swings according to the first storage electrode signal Vcstu. Accordingly, a voltage Vpixh of the first subpixel electrode 191 *a* increases by a constant voltage ΔVp higher than a voltage of the second subpixel electrode 191*b*, and thus a voltage of both ends of the first liquid crystal capacitor Clc1 increases higher than that of both ends of the second liquid crystal capacitor Clc2.

Figure 25B:
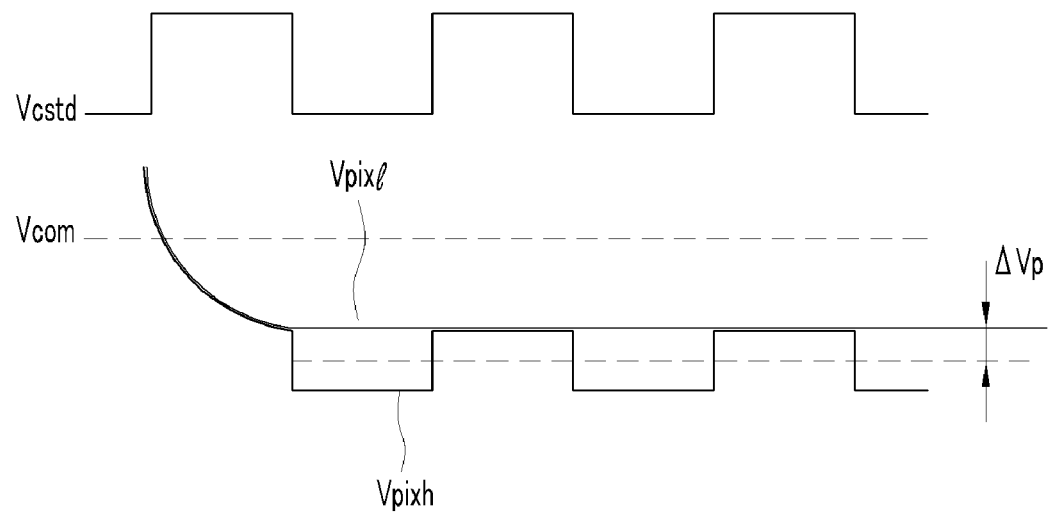

Referring to FIG. 25B, after the switching element Q is turned off, the subpixel electrode 191*b* of the second subpixel PX2 which receives the third storage electrode signal is charged, and thus after an initial voltage change from a positive polarity (+) to a negative polarity (−), the voltage of the subpixel electrode 191*b* remains substantially constant. During the charging of the subpixel electrode 191*b* and after a voltage of the subpixel electrode 191*a* of the first subpixel PX1 which receives the first storage electrode signal Vcstu changes from a positive polarity (+) to a negative polarity (−) the second storage electrode signal Vcstd falls. Thereafter, a voltage of the subpixel electrode 191 *a* of the first subpixel PX1 swings according to the second storage electrode signal Vcstd. Accordingly, a voltage of the first subpixel electrode 191*a* is decreased by a constant voltage ΔVp lower than a voltage of the second subpixel electrode 191*b*, and thus a voltage between both ends of the first liquid crystal capacitor Clc1 increases higher than that between both ends of the second liquid crystal capacitor Clc2.

If a potential difference occurs between both ends of the first or second liquid crystal capacitor Clc1 or Clc2, a primary electric field which is substantially vertical with respect to a surface of the display panels 100 and 200 is generated in the liquid crystal layer 3. Accordingly, liquid crystal molecules of the liquid crystal layer 3 are inclined so that long axes thereof are substantially vertical with respect to a direction of the electric field in response to the electric field. The degree of polarization of light incident to the liquid crystal layer 3 is modified according to a degree to which the liquid crystal molecules are inclined. The change of the polarization changes the amount of transmittance by a polarizer and thus the LCD may display an image.

An inclination angle of the liquid crystal molecule changes according to intensity of the electric field, and because voltages of two liquid crystal capacitors Clc1 and Clc2 are different from each other, the inclination angles of the liquid crystal molecules are different and thus luminance of two subpixels PX1 and PX2 are different. Accordingly, if a voltage of the first liquid crystal capacitor Clc1 and a voltage of the second liquid crystal capacitor Clc2 are properly set, an image which is seen from the side can be approximated to an image which is seen from the front, e.g., a side gamma curve can be approximated to a front gamma curve, so that side visibility can be improved.

Furthermore, if an area of the first subpixel electrode 191*a* having a high voltage becomes smaller than that of the second subpixel electrode 191*b*, a side gamma curve can be approximated to a front gamma curve.

According to the present invention, a sufficient charge time of a liquid crystal display can be secured and vertical crosstalk can be prevented from being generated. Further, a signal line of a liquid crystal display can be efficiently arranged.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a plurality of pixels arranged substantially in a matrix-shape on the first substrate;
a plurality of gate lines disposed on the first substrate and which transmit gate signals to the plurality of pixels;
a plurality of data lines which intersect the plurality of gate lines and which transmit data voltages to the plurality of pixels; and
a data driver attached to one side of the first substrate and connected to the plurality of data lines which transmits a data voltage to at least one of the plurality of data lines,
wherein at least two adjacent gate lines are electrically connected to each other and wherein the plurality of data lines have a first data line applying a first data signal having a first polarity and a second data line applying a second data signal having a second polarity different from the first polarity.

2. The liquid crystal display of claim 1, wherein the data driver is connected to a printed circuit board (PCB).

3. The liquid crystal display of claim 2, wherein the PCB comprises first and second PCBs.

4. The liquid crystal display of claim 1, wherein the plurality of pixels comprises;
a first pixel connected to the first data line; and
a second pixel connected to the second data line,
wherein the first pixel and the second pixel are disposed alternately.

5. The liquid crystal display of claim 1, wherein the plurality of pixels comprises:
a plurality of pixel electrodes disposed on the first substrate; and
a plurality of switching elements, each being connected to at least one pixel electrode of the plurality of pixel electrodes, at least one gate line of the plurality of gate lines, and at least one data line of the plurality of data lines.

6. The liquid crystal display of claim 5, wherein the gate line forms a pair with an adjacent gate line and the paired gate lines are electrically connected to each other.

7. The liquid crystal display of claim 5, wherein the switching elements of adjacent pixels in a column direction are connected to different data lines of the first and second data lines and the switching elements of adjacent pixels in a row direction are connected to different data lines of the first and second data lines.

8. The liquid crystal display of claim 7, wherein at least one of the first and second data lines overlaps with the pixel electrode.

9. The liquid crystal display of claim 5, wherein the pixel electrode further comprises first and second subpixel electrodes which are separated from each other, and wherein each of the switching elements comprises a first switching element connected to the first subpixel electrode and a second switching element connected to the second subpixel electrode.

10. The liquid crystal display of claim 9, wherein the first and second switching elements are connected to the same gate line and data line, and
further comprising a first storage electrode line which receives a first signal, a second storage electrode line which receives a second signal which is different from that of the first storage electrode line, and a third storage electrode line which receives a substantially constant voltage, and
the first subpixel electrode overlaps the first or second storage electrode line, and the second subpixel electrode overlaps the third storage electrode line.

11. The liquid crystal display of claim 9, further comprising a common electrode disposed substantially opposite the first and second subpixel electrodes, and
wherein the common electrode comprises a second inclination direction determination member
wherein the second inclination direction determination member comprises at least one of a cutout and a protrusion.

12. The liquid crystal display of claim 5, further comprising:
a second substrate disposed opposite to the first substrate;
a common electrode disposed on the second substrate; and
a liquid crystal layer interposed between the pixel electrode and the common electrode,
wherein liquid crystal molecules of the liquid crystal layer are aligned in a splay alignment in a state where an electric field is absent, and are aligned in a bend alignment in the presence of an electric field.

13. The liquid crystal display of claim 5, wherein the pixel electrode comprises a plurality of cutouts which form an oblique angle with at least one of the plurality of gate lines and
further comprising an inorganic insulating layer disposed between the pixel electrodes and the common electrode.

14. A liquid crystal display comprising:
a first substrate;
a plurality of pixels arranged substantially in a matrix-shape on the first substrate;
a plurality of gate lines disposed on the first substrate and which transmit gate signals to the plurality of pixels;
a plurality of data lines which intersect the plurality of gate lines and which transmit data voltages to the plurality of pixels; and
a data driver connected to the plurality of data lines which transmits a data voltage to at least one of the plurality of data lines and including a first data driver attached to one side of the first substrate and a second data driver attached to an opposite side of the one side of first substrate,
wherein at least two adjacent gate lines are electrically connected to each other and wherein the plurality of data lines have a first data line applying a first data signal having a first polarity and a second data line applying a second data signal having a second polarity different from the first polarity;
and the first and second data lines are connected to different data drivers of the first and second data drivers.

15. The liquid crystal display of claim 14, wherein the data driver is connected to a PCB including a first PCB connected to the first data driver and a second PCB connected to the second data driver.

16. The liquid crystal display of claim 15, wherein each of the first and second PCBs comprises at least one PCB.

17. The liquid crystal display of claim 14, wherein each of the pixels comprises:
  first and second liquid crystal capacitors;
  a first storage capacitor having a first terminal connected to the first liquid crystal capacitor and a second terminal which receives one of a first storage electrode signal and a second storage electrode signal having a phase opposite to the phase of the first storage electrode signal, and
  a second storage capacitor having a first terminal connected to the second liquid crystal capacitor and a second terminal which receives a constant voltage.

18. The liquid crystal display of claim 17, wherein the each of the pixels further comprises:
  a first switching element connected to at least one of the plurality of gate lines, at least one of the plurality of data lines, the first liquid crystal capacitor, and the first storage capacitor; and
  a second switching element connected to the at least one of the plurality of gate lines, the at least one of the plurality of data lines, the second liquid crystal capacitor, and the second storage capacitor.

19. The liquid crystal display of claim 18, wherein the first and second liquid crystal capacitors comprise first and second subpixel electrodes and a common electrode
  wherein an area of the second subpixel electrode is larger than an area of the first subpixel electrode.

20. The liquid crystal display of claim 17, wherein each of the plurality of gate lines forms a pair with an adjacent gate line and the paired gate lines are electrically connected to each other
  wherein the data lines comprise a plurality of pairs of data lines wherein each pair of data lines includes a first data line and a second data line and wherein a pair of data lines are disposed between adjacent columns of pixels.

21. The liquid crystal display of claim 1, wherein the data driver comprises a plurality of driving circuit chips which are disposed on a plurality of flexible films and are connected to a plurality of printed circuit boards.

22. The liquid crystal display of claim 1, wherein the data driver comprises a plurality of driving circuit chips which are directly mounted on the first substrate.

23. The liquid crystal display of claim 1, wherein the data driver comprises a plurality of driving circuit chips which are mounted on a separate printed circuit board.

\* \* \* \* \*